US012192010B2

(12) United States Patent
Rico Alvarino et al.

(10) Patent No.: US 12,192,010 B2
(45) Date of Patent: Jan. 7, 2025

(54) SEMISTATIC CODEBOOK FOR SIMULTANEOUS RECEPTION

(71) Applicant: QUALCOMM Incorporated, San Diego, CA (US)

(72) Inventors: Alberto Rico Alvarino, San Diego, CA (US); Ayan Sengupta, San Diego, CA (US); Le Liu, Fremont, CA (US); Peter Gaal, San Diego, CA (US); Kazuki Takeda, Tokyo (JP); Motafa Khoshnevisan, San Diego, CA (US); Liangping Ma, San Diego, CA (US); Xiao Feng Wang, San Diego, CA (US); Juan Montojo, San Diego, CA (US); Wanshi Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/451,741

(22) Filed: Oct. 21, 2021

(65) Prior Publication Data
US 2022/0131655 A1  Apr. 28, 2022

Related U.S. Application Data

(60) Provisional application No. 63/104,405, filed on Oct. 22, 2020.

(51) Int. Cl.
*H04L 1/18* (2023.01)
*H04L 1/1812* (2023.01)
*H04L 1/1829* (2023.01)

(52) U.S. Cl.
CPC .......... *H04L 1/1854* (2013.01); *H04L 1/1812* (2013.01)

(58) Field of Classification Search
CPC .............. H04L 1/1854; H04L 1/1812
(Continued)

(56) References Cited

U.S. PATENT DOCUMENTS 9,980,262 B2* 5/2018 Gao ................ H04W 72/1215
2014/0044028 A1* 2/2014 Nammi ................ H04L 1/1825
370/336

FOREIGN PATENT DOCUMENTS

WO  WO-2016163941 A1 * 10/2016 ....... H01L 21/67132

OTHER PUBLICATIONS

ZTE Apr. 3, 2019 R1-1904146 on Scheduling/HARQ enhancements. Published 2019.*
(Continued)

*Primary Examiner* — Sibte H Bukhari
(74) *Attorney, Agent, or Firm* — Paul M. McAdams; Shumaker & Sieffert, PA

(57) ABSTRACT

Certain aspects of the present disclosure provide techniques for reducing a size of semistatic codebooks for HARQ feedback. A method that may be performed by a user equipment (UE) includes determining a number (M) of candidate downlink transmission occasions for a time period, determining a maximum number (k) of simultaneous downlink transmissions the UE can receive during the time period, receiving one or more downlink transmissions during the time period from a base station, and determining a type of encoding for the HARQ feedback based on: (i) a number of the one or more downlink transmissions received, (ii) the number (M) of candidate downlink transmission occasions for the time period, and/or (iii) the maximum number (k) of simultaneous downlink transmissions.

9 Claims, 14 Drawing Sheets

(58) Field of Classification Search
USPC .......................................................... 370/329
See application file for complete search history.

(56) References Cited

OTHER PUBLICATIONS

Interdigital Inc: "UCI Enhancements for eURLLC", 3GPP Draft, R1-1912729, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823566, 10 Pages, Retrieved from the Internet: URL: https://ftp.3gpp.org/tsg_ran/WG1_RL1/TSGR1_99/Docs/R1-1912729.zip R1-1912729 UCI Enhancements for eURLLC.docx, p. 3, par. above Proposal 9.
Partial International Search Report—PCT/US2021/056242—ISA/EPO—Feb. 22, 2022.
ZTE: "On Scheduling/HARQ Enhancements for NR URLLC", 3GPP Draft, R1-1904146, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, 20190408-20190412, Apr. 3, 2019 (Apr. 3, 2019), XP051707146, 7 Pages, Retrieved from the Internet: URL: http://www.3gpp.org/ftp/tsg%5Fran/WG1%5FRL1/TSGR1%5F96b/Docs/R1%2D1904146%2Ezip [retrieved on Apr. 3, 2019] p. 5, par. above Alt. 1, p. 5, Alt. 1-2, p. 6, Alt. 3.
International Search Report and Written Opinion—PCT/US2021/056242—ISA/EPO—Jul. 6, 2022, 19 pages.
Nokia., et al., "Discussion on Enhancements to Scheduling/HARQ for NR URLLC", 3GPP TSG RAN WG1 Meeting #98bis, R1-1910853, 3rd Generation Partnership Project (3GPP), Mobile Competence Centre, 650, Route Des Lucioles, F-06921 Sophia-Antipolis Cedex, France, vol. Ran WG1, No. Chongqing, China, Oct. 14, 2019-Oct. 20, 2019, Oct. 7, 2019, 12 Pages, XP051808981.

\* cited by examiner

Example codebook of binary vectors for $k=3$, $M=4$ in parenthesis (codeword index)

| 0000 (0) | | | | |
| --- | --- | --- | --- | --- |
| 0001 (1) | 0010 (2) | 0100 (3) | 1000 (4) | |
| 0011 (5) | 0110 (6) | 1100 (7) | 1001 (8) | 1010 (9) | 0101 (10) |
| 1110 (11) | 1101 (12) | 1011 (13) | 0111 (14) | | |
| 1111 (15) | | | | | |

Not needed

| 0000 (0) | | | | |
| 0001 (1) | 0010 (2) | 0100 (3) | 1000 (4) | |
| 0011 (5) | 0110 (6) | 1100 (7) | 1001 (8) | 1010 (9) | 0101 (10) |
| 1110 (11) | 1101 (11) | 1011 (11) | 0111 (11) | |
| 1111 (15) | | | | |

Example codebook of binary vectors for $k=3$, $M=4$ in parenthesis (codeword index)

Multiple codewords map to a single index value ↗

Not needed ↗

|  | $k=0$ | $k=1$ | $k=2$ | $k=3$ | $k=4$ | Total (bits) |
|---|---|---|---|---|---|---|
| Feasible Combinations | 1 | $(28,1)=28$ | $(28,2)=378$ | $(28,3)=3{,}276$ | $(28,4)=20{,}475$ | 24,158 (14.6) |
| Maximum $k$ Encoding | * | * | * | * | 1 | 3,684 (11.8) |
| Hamming distance 3 code | * | * | * | Shortened (63, 57) code >6 bit parity ($2^6=64$) | (included in $k=3$) | 471 (8.9) |

FIG. 7

Example codebook of binary vectors for $k=3$, $M=4$ in parenthesis (codeword index)

| 0000 (0) | 0010 (2) | 0100 (3) | 1000 (4) | | |
|---|---|---|---|---|---|
| 0001 (1) | 0110 (6) | 1100 (5) | 1001 (6) | 1010 (7) | |
| 0011 (5) | 1101 (2) | 1011 (3) | 0111 (4) | 0101 (7) | |
| 1110 (1) | | | | | |
| 1111 | | | | | |

Not needed

FIG. 10

SEMISTATIC CODEBOOK FOR SIMULTANEOUS RECEPTION

CROSS-REFERENCE TO RELATED APPLICATION(S)

This application claims benefit of and priority to U.S. Provisional Application No. 63/104,405, filed Oct. 22, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for hybrid automatic repeat request (HARM) feedback.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects relate to a first network node for wireless communication, wherein the first network node includes a memory and a processor communicatively coupled to the memory. In some examples, the processor is configured to determine a number (M) of candidate downlink transmission occasions for a time period. In some examples, the processor is configured to determine a maximum number (k) of simultaneous downlink transmissions the first network node can receive during the time period. In some examples, the processor is configured to receive one or more downlink transmissions during the time period from a second network node. In some examples, the processor is configured to encode hybrid automatic repeat request (HARQ) feedback based at least on the number M and the maximum number k. In some examples, the processor is configured to transmit the encoded HARQ feedback to the second network node.

Certain aspects relate to a first network node for wireless communication, wherein the first network node includes a memory and a processor communicatively coupled to the memory. In some examples, the processor is configured to determine a number (M) of candidate downlink transmission occasions for a time period. In some examples, the processor is configured to determine a maximum number (k) of simultaneous downlink transmissions a second network node can receive during the time period. In some examples, the processor is configured to transmit one or more downlink transmissions during the time period. In some examples, the processor is configured to receive, from the second network node, an encoded HARQ feedback in response to the one or more downlink transmissions, the HARQ feedback encoded based at least on: the number M of candidate downlink transmission occasions for the time period, and the maximum number k of simultaneous downlink transmissions.

Certain aspects relate to a method for wireless communication performed by a first network node. In some examples, the method includes determining a number (M) of candidate downlink transmission occasions for a time period. In some examples, the method includes determining a maximum number (k) of simultaneous downlink transmissions the first network node can receive during the time period. In some examples, the method includes receiving one or more downlink transmissions during the time period from a second network node. In some examples, the method includes encoding hybrid automatic repeat request (HARQ) feedback based at least on the number M and the maximum number k. In some examples, the method includes transmitting the encoded HARQ feedback to a second network node.

Certain aspects relate to a method for wireless communication performed by a first network node. In some examples, the method includes determining a number (M) of candidate downlink transmission occasions for a time period. In some examples, the method includes determining a maximum number (k) of simultaneous downlink transmissions a second network node can receive during the time period. In some examples, the method includes transmitting one or more downlink transmissions during the time period. In some examples, the method includes receiving, from the second network node, an encoded HARQ feedback in response to the one or more downlink transmissions, the HARQ feedback encoded based at least on: the number M of candidate downlink transmission occasions for the time period, and the maximum number k of simultaneous downlink transmissions.

Certain aspects relate to a first network node. In some examples, the first network node includes means for determining a number (M) of candidate downlink transmission occasions for a time period. In some examples, the first network node includes means for determining a maximum number (k) of simultaneous downlink transmissions the first network node can receive during the time period. In some examples, the first network node includes means for receiving one or more downlink transmissions during the time period from a second network node. In some examples, the first network node includes means for encoding hybrid automatic repeat request (HARQ) feedback based at least on the number M and the maximum number k. In some examples, the first network node includes means for transmitting the encoded HARQ feedback to a second network node.

Certain aspects relate to a first network node. In some examples, the first network node includes means for determining a number (M) of candidate downlink transmission occasions for a time period. In some examples, the first network node includes means for determining a maximum number (k) of simultaneous downlink transmissions a second network node can receive during the time period. In some examples, the first network node includes means for transmitting one or more downlink transmissions during the time period. In some examples, the first network node includes means for receiving, from the second network node, an encoded HARQ feedback in response to the one or more downlink transmissions, the HARQ feedback encoded based at least on: the number M of candidate downlink transmission occasions for the time period, and the maximum number k of simultaneous downlink transmissions.

Certain aspects relate to a non-transitory computer-readable storage medium having instructions stored thereon for performing a method of wireless communication by a first network node. In some examples, the method includes determining a number (M) of candidate downlink transmission occasions for a time period. In some examples, the method includes determining a maximum number (k) of simultaneous downlink transmissions the first network node can receive during the time period. In some examples, the method includes receiving one or more downlink transmissions during the time period from a second network node. In some examples, the method includes encoding hybrid automatic repeat request (HARQ) feedback based at least on the number M and the maximum number k. In some examples, the method includes transmitting the encoded HARQ feedback to a second network node.

Certain aspects relate to a non-transitory computer-readable storage medium having instructions stored thereon for performing a method of wireless communication by a first network node. In some examples, the method includes determining a number (M) of candidate downlink transmission occasions for a time period. In some examples, the method includes determining a maximum number (k) of simultaneous downlink transmissions a second network node can receive during the time period. In some examples, the method includes transmitting one or more downlink transmissions during the time period. In some examples, the method includes receiving, from the second network node, an encoded HARQ feedback in response to the one or more downlink transmissions, the HARQ feedback encoded based at least on: the number M of candidate downlink transmission occasions for the time period, and the maximum number k of simultaneous downlink transmissions.

Aspects of the present disclosure provide means for, apparatus, processors, and computer-readable mediums for performing techniques and methods that may be complementary to the operations by each of the UE and by the BS described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a block diagram illustrating an example codebook configured based on a maximum number of simultaneous downlink transmissions the UE can receive.

FIG. 6 is a block diagram illustrating an example codebook configured based on a maximum number of simultaneous downlink transmissions the UE can receive, in accordance with certain aspects of the present disclosure.

FIG. 7 is a table illustrating an example of codebook sizes based on a combination of the techniques described in FIG. 5 (e.g., feasible combinations) and FIG. 6 (e.g., maximum k encoding), as well as a Hamming distance 3 code, in accordance with certain aspects of the present disclosure.

FIG. 10 is a block diagram illustrating an example codebook configured based on a maximum number of simultaneous downlink transmissions the UE can receive, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
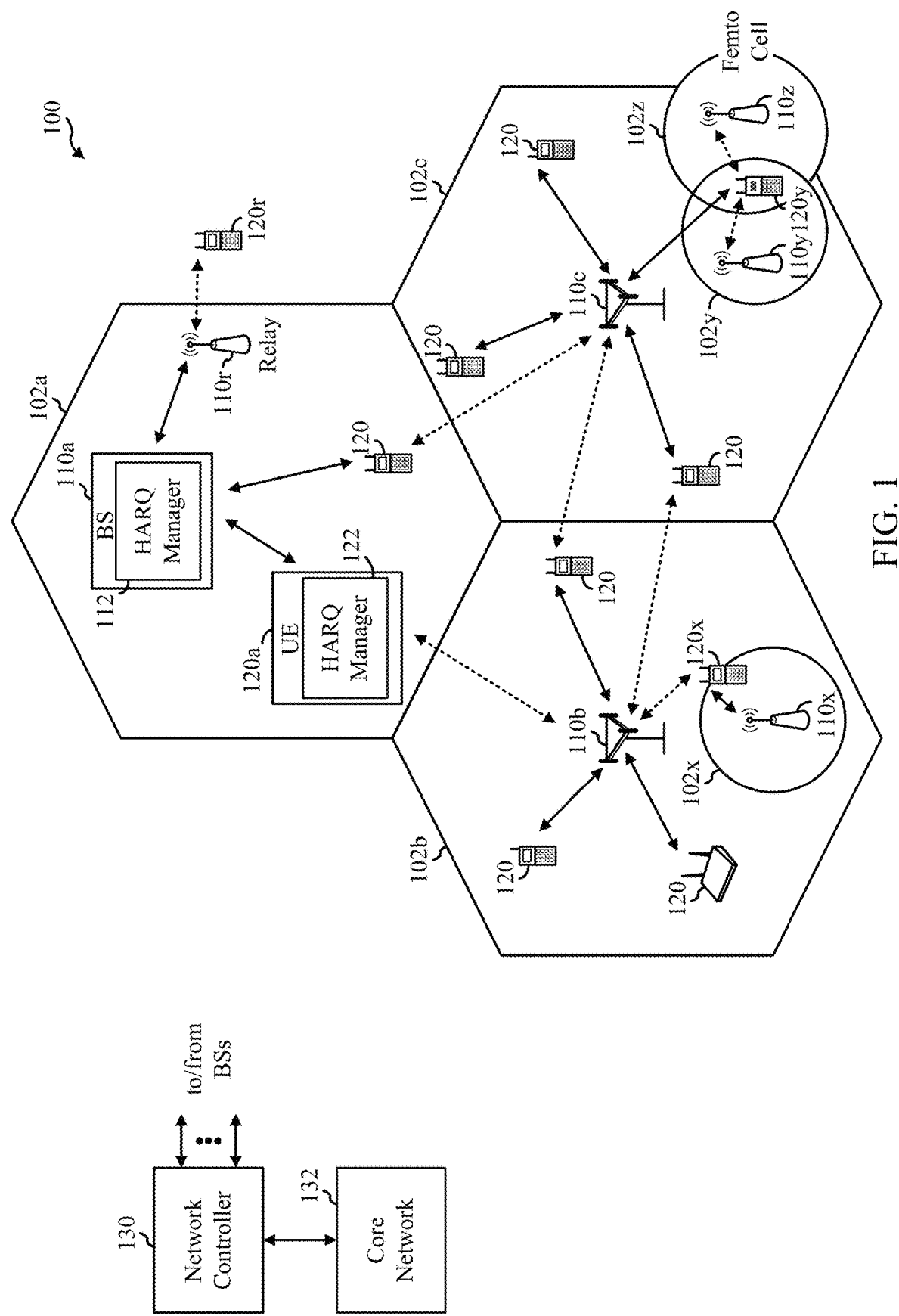
FIG. 1 is a block diagram conceptually illustrating an example telecommunications system, in accordance with certain aspects of the present disclosure.

Aspects of the present disclosure provide apparatus, methods, processing systems, and computer readable mediums for techniques for reducing a size of a semistatic codebook for HARQ feedback.

In certain aspects, a network node, such as a UE, is configured to provide feedback to a transmitting device (e.g., another network node, such as a base station (BS)), indicating whether the UE has successfully received and decoded a transmission sent from the transmitting device. In certain aspects, the feedback is one or more of an acknowledgement (ACK) indicating the UE has successfully received and decoded the transmission and/or a negative ACK (NACK) indicating the UE has not successfully received and decoded the transmission. In certain aspects, reference to ACK feedback, HARQ-ACK feedback, or HARQ feedback herein may generally refer to feedback using ACK and/or NACK indications.

In certain aspects, a UE transmits an ACK when it has successfully received and decoded the transmission and refrains from transmitting an ACK when it has not successfully received and decoded the transmission. In certain aspects, a UE transmits a NACK when it has not successfully received and decoded the transmission and refrains from transmitting a NACK when it has successfully received and decoded the transmission. In certain aspects (e.g., for a HARQ process with feedback enabled as discussed herein), a UE transmits an ACK when it has successfully received and decoded the transmission and transmits a NACK when it has not successfully received and decoded the transmission.

In certain aspects, a UE is configured with one or more HARQ processes. Accordingly, in certain aspects, the UE maintains one or more buffers, each buffer corresponding to one of the one or more HARQ processes. Each HARQ process may be used for buffering data for a given downlink channel (e.g., control channel such as a physical downlink control channel (PDCCH) or a data channel such as a physical downlink shared channel (PDSCH)) at a time (e.g., per subframe, slot, etc.). In particular, as part of a HARQ process, the UE buffers data that is received even if it cannot successfully decode the data, and informs the BS that it could not decode the data for that channel for that time period. The BS may then resend the data to the UE, and the UE may then use both the previously received data and the resent data in combination (e.g., soft combining) to attempt to decode the data. Accordingly, different HARQ processes of the UE may be assigned to different downlink channels/downlink occasions at a time, and used to try and successfully receive and decode data. Each HARQ process may be identified by an identifier referred to as a HARQ ID, so that the receiver and transmitter are aware of which data belongs to which HARQ process.

In certain aspects, ACK/NACK feedback reported by a UE may be formatted according to a codebook. For example, a codebook with respect to HARQ may define the number of HARQ bits to be reported and the order in which certain HARQ bits are arranged. The codebook may also define what each HARQ bit represents based on the location of the HARQ bit in the HARQ feedback. For example, a given HARQ bit may correspond to a specific CBG, a specific TB, a specific HARQ process, a specific carrier, and a specific serving cell. The codebook provides a mapping of the HARQ bit locations in the HARQ feedback to specific HARQ transmissions based on the respective CBG, TB, HARQ process, carrier, and/or serving cell. As used herein, a carrier may refer to a component carrier.

Typically, a HARQ codebook (e.g., semistatic (Type-1) codebook) accommodates as many bits as potential downlink channel (e.g., downlink data channel such as physical downlink shared channel (PDSCH)) receptions (e.g., for a HARQ-ACK occasion) a UE is capable of performing during a time period. The downlink channel receptions may be on different time and/or frequency resources. Accordingly, a large number of potential downlink channel receptions may mean that the ACK/NACK feedback reported spans a large number of bits, utilizing more bandwidth for reporting feedback. Accordingly, certain aspects herein advantageously reduce the size of the HARQ codebook, thereby reducing the number of bits needed to report ACK/NACK feedback. This may beneficially free bandwidth for other communications thereby increasing communication efficiency and potentially rate of data transfer.

The following description provides examples of encoding techniques for reducing the size of a semistatic codebook for HARQ feedback in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for determining HARQ feedback based on a maximum number of simultaneous downlink transmissions the UE 120 is configured to receive. As shown in FIG. 1, the BS 110a includes a HARQ manager 112. The HARQ manager 112 may be configured to determine a number (M) of candidate downlink transmission occasions for a time period. The HARQ manager 112 may also be configured to determine a maximum number (k) of simultaneous downlink transmissions a user equipment (UE) can receive during the time period. The HARQ manager 112 may also be configured to transmit one or more downlink transmissions during the time period. The HARQ manager 112 may also be configured to receive, from the UE, a HARQ feedback in response to the one or more downlink transmissions, the HARQ feedback encoded using a type of encoding based on: the number (M) of candidate downlink transmission occasions for the time period, and the maximum number (k) of simultaneous downlink transmissions.

As shown in FIG. 1, the UE 120a includes a HARQ manager 122. The HARQ manager 122 may be configured to determine a number (M) of candidate downlink transmission occasions for a time period. The HARQ manager 122 may also be configured to determine a maximum number (k) of simultaneous downlink transmissions the UE can receive during the time period. The HARQ manager 122 may also be configured to receive one or more downlink transmissions during the time period from a base station. The HARQ manager 122 may also be configured to determine a type of encoding for the HARQ feedback based on: (i) a number of the one or more downlink transmissions received, (ii) the number (M) of candidate downlink transmission occasions for the time period, and (iii) the maximum number (k) of simultaneous downlink transmissions. The HARQ manager 122 may also be configured to encode the HARQ feedback using the determined type of encoding. The HARQ manager 122 may also be configured to transmit the HARQ feedback to the base station.

Figure 2:
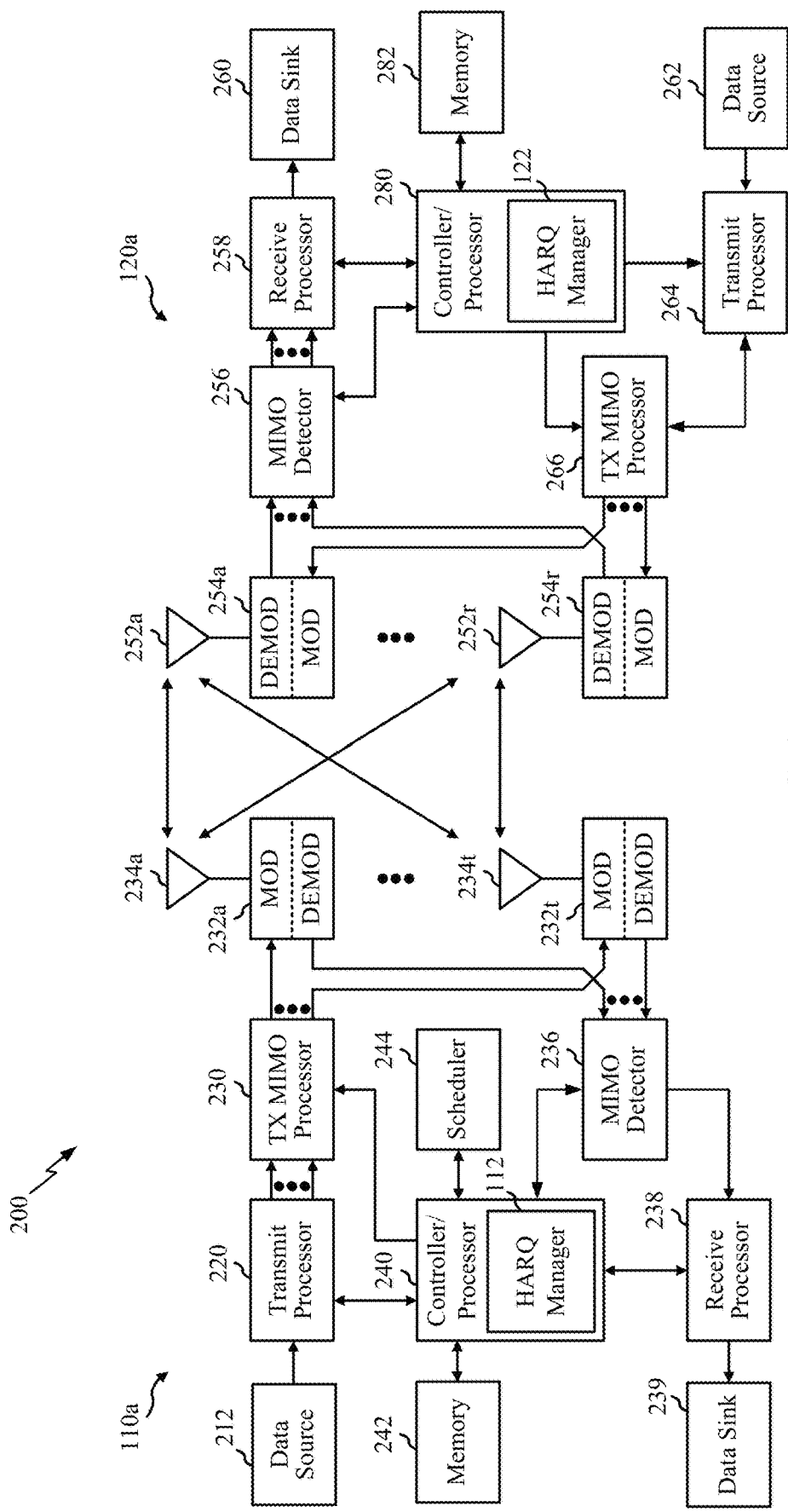
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a includes the HARQ manager 112 that may be configured for determining HARQ feedback based on a maximum number of simultaneous downlink transmissions the UE 120 is configured to receive. The HARQ manager 112 may be configured to determine a number (M) of candidate downlink transmission occasions within a time period (e.g., search space) of the UE 120. The HARQ manager 112 may also be configured to determine a maximum number (k) of simultaneous downlink transmissions the UE can receive within the time period, and transmit one or more downlink transmissions within the time period. The HARQ manager 112 may also be configured to receive, from the UE, a HARQ feedback in response to the one or more downlink transmissions, the HARQ feedback based on: (i) the number (M) of candidate downlink transmission occasions for the time period, and (ii) the maximum number (k) of simultaneous downlink transmissions.

As shown in FIG. 2, the controller/processor 280 of the UE 120a includes the HARQ manager 122 that may be configured for determining a number (M) of candidate downlink transmission occasions for a time period, according to aspects described herein. The HARQ manager 122 may be configured to determine a number (M) of candidate downlink transmission occasions for a time period. The HARQ manager 122 may also be configured to determine a maximum number (k) of simultaneous downlink transmissions the UE can receive in the time period. The HARQ manager 122 may also be configured to receive one or more downlink transmissions in the time period from a base station. The HARQ manager 122 may also be configured to determining the HARQ feedback based on: (i) a number of the one or more downlink transmissions received, (ii) the number (M) of candidate downlink transmission occasions for the time period, and (iii) the maximum number (k) of simultaneous downlink transmissions. The HARQ manager 122 may also be configured to transmit the HARQ feedback to the base station. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
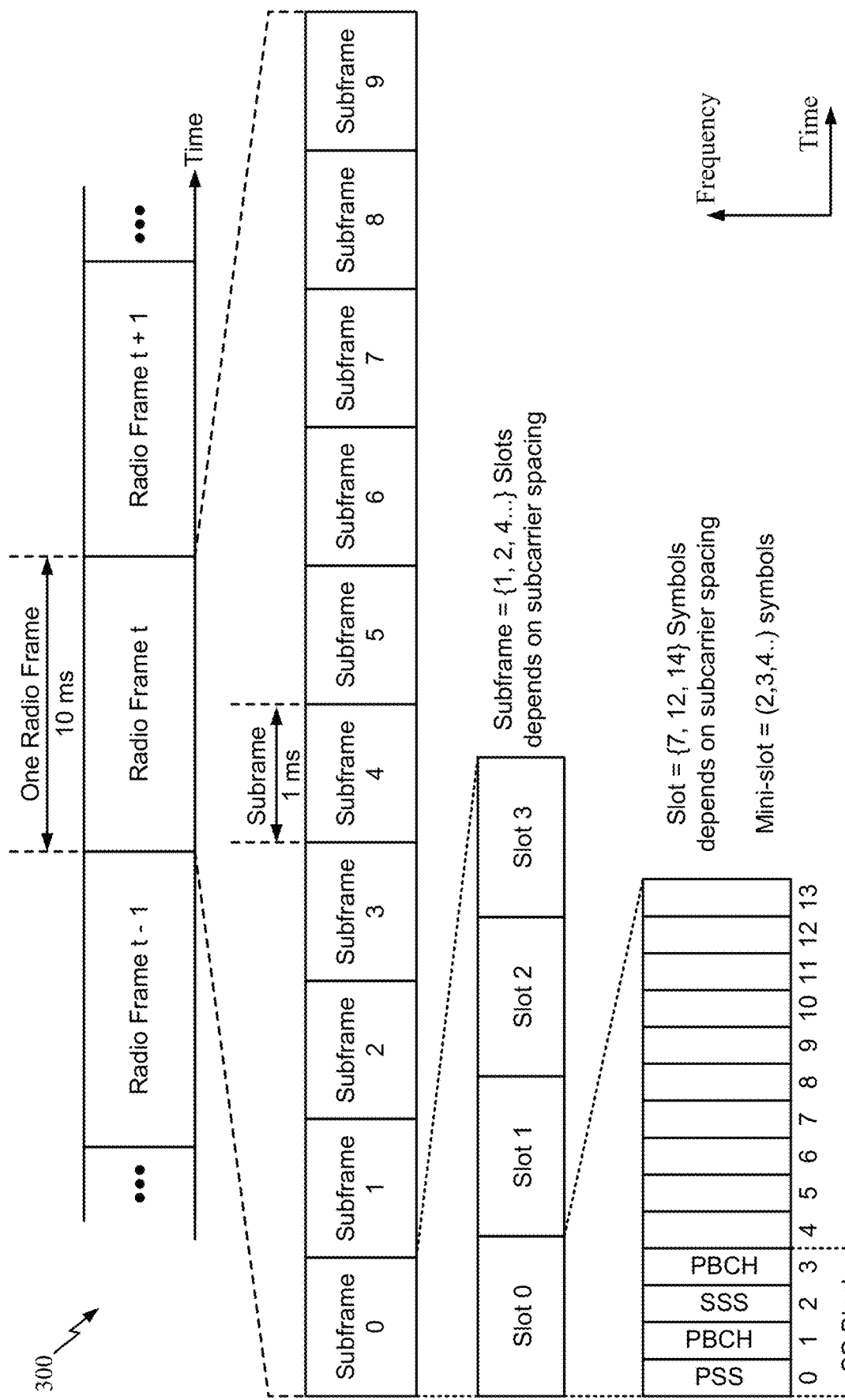
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some cases, a base station may communicate downlink transmissions to a UE using a downlink channel in a slot and/or mini slot. In response, the UE may transmit feedback transmissions to the base station in response to receipt or not receiving the downlink transmission. For example, base station may send downlink transmissions on a physical downlink shared channel (PDSCH) using the slot or a portion of the slot. The UE may receive the downlink data transmitted by base station and may send feedback transmissions. In some cases, downlink transmissions may include one or more downlink messages and feedback transmissions may include HARQ feedback (e.g., formatted according to a semistatic HARQ-ACK codebook).

According to some aspects, the UE may use HARQ feedback to ensure reception of the transmitted data. For example, the UE may send HARQ feedback transmissions that include an acknowledgement (ACK) or a negative acknowledgement (NACK) for data received by the UE. In such cases, the UE may monitor for downlink messages sent by base station during one or more downlink transmission occasions. In some examples, each downlink transmission occasion is characterized by a time period (e.g., a subframe, slot, mini slot, etc.) during which the UE monitors a set of resources (e.g., resource elements (REs), resource blocks (RBs), etc.) to identify data sent to the UE from the base station.

Example HARQ Codebook for Multicast and Unicast Transmissions

In certain wireless communication systems (e.g., 5G NR), a radio access network (RAN), such as the BS 110*a* and/or network controller 130, may transmit data to multiple UEs (such as the UEs 120*a*, 120*b*) in a multicast/broadcast manner. In other words, a data transmission may be scheduled and sent to multiple UEs simultaneously. Multicast transmissions may enable desirable spectral efficiency for providing multiple UEs downlink data. As an example, a group of UEs may receive group/common downlink scheduling with a cyclic redundancy check (CRC) scrambled with a group radio network temporary identifier (G-RNTI), which is known to the group of UEs, and on a group/common PDCCH. The UEs may receive simultaneously a multicast/broadcast data transmission via a group/common PDSCH, where the scrambling of the PDSCH may be based on the same G-RNTI used for the PDCCH. In certain cases, a UE may support FDM between a unicast PDSCH and a group-common PDSCH in a slot. In other words, the UE may receive unicast data transmissions simultaneously with multicast data transmissions. In certain cases, a UE may support slot-level repetition for group-common PDSCH.

In certain cases, a wireless communication network may support transmission of data with hybrid automatic repeat request (HARQ) to provide forward error correction in addition to automatic re-transmission of corrupted data at a receiver. For example, a transmitter (e.g., the BS 110*a*) may send an initial transmission of data to a receiver (e.g., a UE), and if the data is corrupted at the receiver, the transmitter may send one or more retransmissions of the data (such as a transport block (TB), codeblock group (CBG), or one or more codeblocks) until the data is successfully decoded at the receiver, or the maximum number of retransmissions of the data has occurred, or some other termination condition is encountered.

As re-transmissions are received, the receiver may combine all of the received transmissions (including the initial transmission and re-transmissions) to attempt to decode the data. In certain cases, the receiver may send an acknowledgment (ACK) if the data is decoded successfully or a negative-ACK (NACK) if the data is decoded in error or unsuccessfully. The transmitter may send a re-transmission of the data if a NACK is received and may terminate transmission of the data if an ACK is received. In certain cases, the transmitter may send a re-transmission if the transmitter fails to receive an ACK within a certain period of time. The transmitter may process (e.g., encode and modulate) the data with forward error correction and/or redundancy information, which may be selected such that the data can be decoded successfully with a high probability. The data may also be referred to as a TB, a codeword, a data block, etc. In certain cases, a data transmission (e.g., a transport block) may be segmented into codeblocks (CBs), and re-transmissions may be triggered on a CBG basis (e.g., a group of codeblocks). In other words, a re-transmission may include a portion of the initial transmission, such as a codeblock group of a transport block.

In aspects, ACK/NACK feedback reported by a UE may be formatted according to a codebook. For example, a codebook with respect to HARQ may define the number of HARQ bits to be reported and the order in which certain HARQ bits are arranged. The codebook may also define what each HARQ bit represents based on the location of the HARQ bit in the HARQ feedback. For example, a given HARQ bit may correspond to a specific CBG, a specific TB, a specific HARQ process, a specific carrier, and a specific serving cell. The codebook provides a mapping of the HARQ bit locations in the HARQ feedback to specific HARQ transmissions based on the respective CBG, TB, HARQ process, carrier, and/or serving cell. As used herein, a carrier may refer to a component carrier.

In certain cases, a one-shot HARQ-ACK feedback scheme may be employed for the transmitter to request HARQ-ACK feedback on a dynamic basis. That is, a receiver may be configured to refrain from reporting HARQ-ACK feedback, until the transmitter sends a request for HARQ feedback to the receiver. For example, the one-shot HARQ-ACK feedback scheme may be employed when the network is transmitting certain packets without re-transmissions (e.g., in URLLC applications), and the network may decide when to request HARQ feedback from a UE, for example, when certain network demands and/or loads (e.g., data rates, latencies, reliability) have lessened. In response to the one-shot HARQ-ACK feedback request, the receiver may send, to the transmitter, the latest status of all of the HARQ processes configured for one or more carriers and/or serving cells. That is, the receiver may send a current snapshot of the ACK-NACK information related to the transmission(s) received at the receiver.

Conventionally, the UE may be configured with a plurality of G-RNTIs and a C-RNTI in a serving cell, but may be able to receive only a limited number of PDSCHs simultaneously. That is, the UE may be configured with a codebook having more combinations of HARQ ACK bits than are necessary. For example, if the UE is configured with ten G-RNTIs and one C-RNTI, the UE may determine eleven PDSCHs for a downlink occasion based on a conventional semistatic codebook. However, if the UEs capability for simultaneous downlink reception is reduced (e.g., to a maximum of 2 simultaneous PDSCHs), many of the combinations of the conventional semistatic codebook would be invalid. In another example, the UE may be configured with four component carriers (CCs), and thus, be using a conventional codebook having 4-bit ACKs. However, as is often the case, the UE may only be utilizing two downlink chains. As such, the UE does not require all bits of the 4-bit ACK to indicate simultaneous reception of downlink transmissions. In another example, the UE may be configured with seven mini-slots in one slot and thus, will be using a conventional codebook having 7-bit ACKs. However, if the UE is limited to receiving less than 7 PDSCHs in a slot, then the UE does not require all of the 7-bits to indicate ACK/NACK of downlink transmissions.

Thus, the techniques described herein provide for using a semistatic HARQ codebook that is based on the number (e.g., quantity) of downlink transmissions that the UE can simultaneously receive. Accordingly, the codebook described herein may reduce the total number of bits required for HARQ ACK communication, which may provide desirable spectral efficiencies for the uplink and downlink channels. In aspects, the HARQ codebook described herein may enable desirable data rates and/or latencies for multicast and unicast transmissions due to the reduction of the bits required for HARQ feedback.

Example Codebook Size Reduction Based on a Number of Feasible Feedback Combinations for Simultaneous Downlink Receptions Aspects of the present disclosure provide a semistatic codebook that is generated based on a number (e.g., quantity) of downlink transmissions that the UE can simultaneously receive. In some examples, "simultaneously receive" may relate to a maximum number of downlink transmissions the UE is configured to receive in a single time period (e.g., slot), for example where each of the downlink transmissions is no larger than a mini slot. For space division multiplexing (SDM) and frequency division multiplexing (FDM) unicast or multicast, "simultaneously receive" may relate to the maximum number of downlink transmissions the UE can receive simultaneously.

In some examples, "simultaneously receive" may relate to a maximum number of carriers that the UE can receive a downlink transmission in, such as in a super-downlink scenario. A UE configured for super-downlink may be capable of receiving downlink transmissions through cross-carrier (e.g., across multiple component carriers (CCs)) scheduling. In some examples, the number of downlink transmissions that a UE can simultaneously receive may be configured by a base station or other network node (e.g., core network node), or may be based on simultaneous reception capabilities of the UE (e.g., the maximum number of downlink transmissions the UE is capable of receiving).

As described below, a UE (e.g., UE 120 of FIG. 1) may be configured to communicate HARQ feedback to a base station based on a number (M) of candidate downlink transmission occasions for a time period, and a maximum number (k) of simultaneous downlink transmissions the UE can receive during the time period. Thus, when the UE successfully receives one or more downlink transmissions during the time period from the base station, the UE may determine a type of encoding for the HARQ feedback based on: (i) a number of the one or more downlink transmissions received, (ii) the number (M) of candidate downlink transmission occasions for the corresponding time period, and (iii) the maximum number (k) of simultaneous downlink transmissions. The UE may then encode the HARQ feedback using the determined type of encoding, and transmit the HARQ feedback to the base station.

Figure 4A:
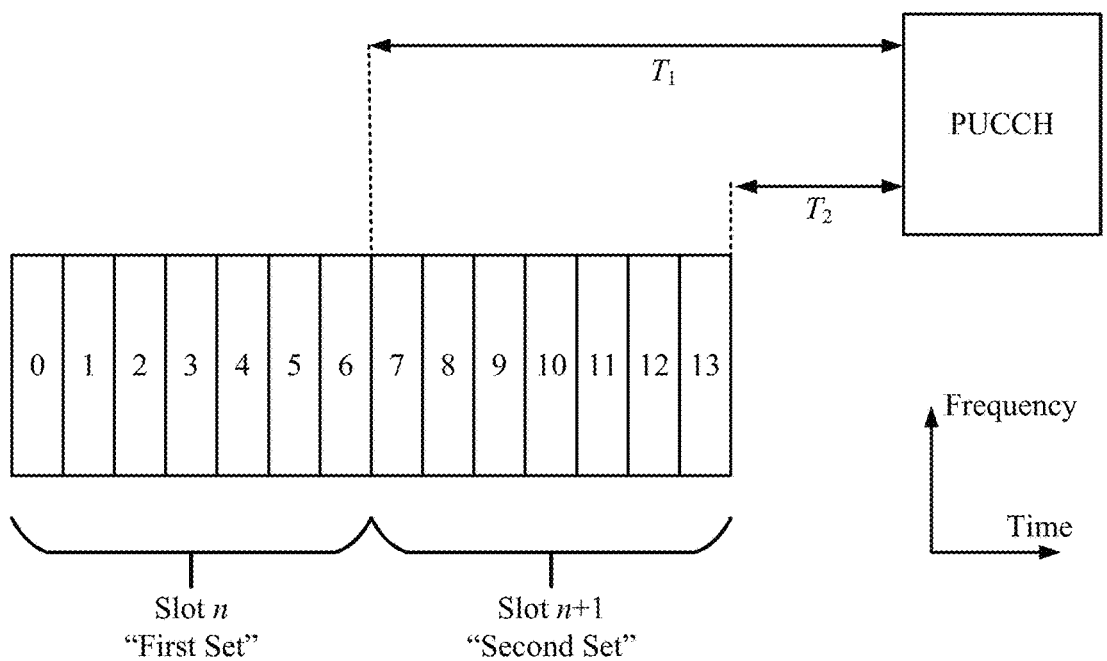
FIGS. 4A and 4B are block diagrams illustrating two separate examples of downlink transmission grouping by a UE.
Figure 4B:
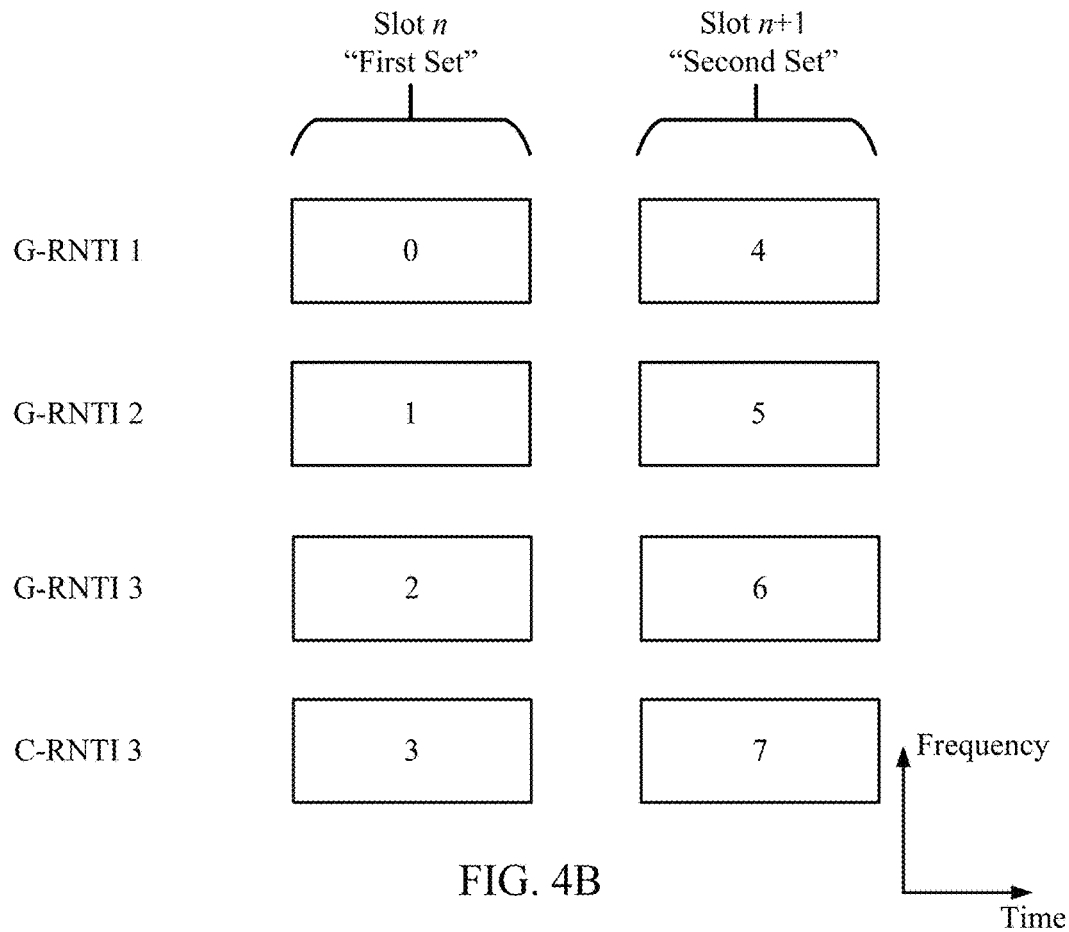

FIGS. 4A and 4B are block diagrams illustrating two separate examples of downlink transmission grouping by a UE. First, FIG. 4A illustrates two slots ("slot n" and "slot n+1"). In this example, both slot n and slot n+1 include a first set and a second set, respectively, of seven mini slots or time windows during which the UE may receive a downlink transmission. Here, each time window may be a downlink transmission occasion that the UE monitors for a downlink transmission. In this example, the UE may simultaneously receive seven downlink transmissions during each slot, given that the UE is suitably configured. The UE may also aggregate HARQ feedback for both slots in a single PUCCH if certain timing requirements are met (e.g., duration $T_1$ and $T_2$ are no shorter than a time limit required for the UE to determine the downlink transmission was successful/unsuccessful, and to generate an ACK/NACK).

FIG. 4B illustrates a parallel unicast/multicast example with a set of three G-RNTI occasions and one C-RNTI occasion. Here, each G-RNTI/C-RNTI occasion may occupy the same slot or same set of symbols.

Depending on the capabilities of a UE or the configuration provided to the UE via a network node, a conventional HARQ feedback codebook may include many combinations for ACK/NACK feedback that will never be used. This is because a conventional HARQ feedback codebook is generally a one-size-fits-all configuration. Using FIG. 4A as an example, a UE may only be capable of receiving a single downlink transmission per slot (e.g., only one downlink transmission occasion can be used by the UE to receive downlink data). In such an example, a conventional codebook may provide a total of $2^7$ (e.g., 128) possible HARQ feedback combinations, whereas only 8 of those combinations can be used by the UE due to its limited ability to receive simultaneous downlink transmissions. Thus, only 3-bits are required by the UE for transmission of one of the 8 combinations, whereas 7-bits would otherwise be required and would cover combinations of bits that the UE would never use.

FIG. 5 is a block diagram illustrating an example codebook 500 configured based on a maximum number of simultaneous downlink transmissions the UE can receive. The codebook 500 may be configured for a number (M) of candidate downlink transmission occasions for a time period (e.g., a slot). In the example shown, the codebook 500 is configured for M=4, but also takes into account the maximum number (k) of simultaneous downlink transmissions the UE can receive during the time period (in this example, k=3).

Several entries in the codebook 500 are illustrated as having a corresponding 4-bit binary number followed by an integer in parenthesis. Here, the 4-bit binary number may represent a binary vector with 0s for downlink transmission occasion locations where no data or the UE was unable to successfully decode the data received, and 1s for positions of downlink transmissions received and the data successfully decoded. Here, each bit in the binary vectors may be used to represent the position of a downlink transmission location relative to other downlink transmission locations in the time period. The integer in the parenthesis represents a codeword index corresponding to a particular binary vector of one or more binary vectors. For example, in a time period having M=4 downlink transmission occasions that a UE is monitoring for downlink transmissions: if the UE receives and successfully decodes a single downlink transmission during a first downlink transmission occasion within time period, the UE may determine a corresponding codeword (e.g., 0001, 0010, 0100, or 1000, depending on the location of the first downlink transmission occasion within time period).

Thus, if the UE receives one or more downlink transmissions within the time period, the UE may calculate a resulting binary vector for all of the one or more downlink transmissions based on a binary vector of each of the one or more downlink transmissions. It should be noted that each of the received one or more downlink transmissions is characterized by a binary vector indicating a location of a corresponding downlink transmission occasion.

The UE may then determine a codeword index that corresponds to the determined codeword, then transmit that codeword index to the base station that transmitted the single downlink transmission. The base station will then map the received codeword index to the corresponding codeword and determine that the UE successfully received the single downlink transmission. That is, for a time period with M possible downlink transmission occasions, and a UE with a simultaneous reception limit of k, a plurality of codeword combinations that the UE can actually use are the set of binary vectors with M binary elements and a weight (e.g., a number of possible ACK bits or "1" bits, in the binary vector) that is less than or equal to k.

As illustrated, the codebook 500 for the UE having M=4 and k=3 will not include a codeword index of 15 because a binary vector of 1111 is not a feasible response from the UE. As noted above, the UE can only receive up to three simultaneous downlink transmissions, thus any feasible binary vector can only have a weight of three or less. Here, binary vector 1111 has a weight of four, but the UE can only receive a maximum of three simultaneous downlink transmissions. Thus, there are no scenarios where the UE will transmit the codeword index of 15.

As discussed, the codebook 500 may be configured based on a maximum number (k) of simultaneous downlink transmissions the UE can receive. In one example, the number of codewords in a codebook can be determined using Equation 1, which represents the total number of binary vectors of length M with weight k or less:

$$T(M,k) = \sum_{i=0}^{k} \binom{M}{i}$$ Equation 1

Equation 1 may be used to determine the number of codebook indices for a UE based on the M and k values, where T represents an index (e.g., index ranging from 1 to T, or from 0 to T−1) that may be configured at the UE 120a by the BS 110a (e.g., using radio resource control (RRC) signaling), by another network node, or based on wireless standards. For example, the equation may determine a number of codebook entries that will be required to encode all the possible binary vectors based on the UEs capabilities. Thus, while a conventional codebook may include the codeword index "15," the codebooks described herein may reduce in size by omitting any codeword entries that the UE will not use. In this example, a conventional 16 entry codebook can be reduced down to 15 entries.

FIG. 6 is a block diagram illustrating an example codebook 600 configured based on a maximum number of simultaneous downlink transmissions the UE can receive. Similar to the codebook 500 of FIG. 5, the codebook 600 of FIG. 6 may be configured for a number (M) of candidate downlink transmission occasions for a time period (e.g., a slot). In the example shown, the codebook 600 is configured for M=4, but also takes into account the maximum number (k) of simultaneous downlink transmissions the UE can receive during the time period (in this example, k=3).

Because the UE can only receive a maximum of three simultaneous downlink transmissions, any base station or other network node that transmits the downlink data to the UE will only transmit a maximum of three downlink transmissions for a given time period. Accordingly, if the UE receives three simultaneous downlink transmissions in a given time period, the base station may not necessarily be concerned with a location of the three downlink transmissions within time period. This is because the base station is already aware of the locations of the downlink transmissions. Thus, feedback from the UE indicating successful receipt of all three downlink transmissions when k=3 can be provided by the UE without necessarily including the location of each downlink transmission.

As shown, the codebook 600 includes a row of codewords all corresponding to a HARQ feedback having weight three. Although each codeword indicates a particular location of each of the three successfully received downlink transmissions, only one codeword index (11) is required for each of the codewords. Thus, when the UE successfully receives k number of downlink transmissions, the UE can respond to the base station with a codeword index that maps to every codeword having a weight of k to indicate the successful receipt. In this example, a conventional 16 entry codebook can be reduced down to 12 entries.

In one example, the number of codewords in a codebook can be determined using Equation 2:

$$T(M,k) = 1 + \sum_{i=0}^{k-1} \binom{M}{i}$$ Equation 2

Here, equation 2 can provide a number of indices required in a codebook when a single index value is mapped to all codewords that indicate k simultaneous downlink transmissions were successfully received during a given time period. T represents an index (e.g., index ranging from 1 to T, or from 0 to T−1) that may be configured at the UE 120a by the BS 110a or by another network node. In some examples, T may also be configured according to wireless communication standards.

Thus, as illustrated in FIGS. 5 and 6, the UE may encode a HARQ feedback by selecting a HARQ codeword (e.g., ACK codeword) index from a set (or codebook) of codeword indices, wherein each codeword index in the plurality of codeword indices corresponds to one of a plurality of binary vectors, each of the plurality of binary vectors comprising M elements and a weight less than or equal to k. The UE may then transmit the selected HARQ codeword index to the base station.

Example Codebook Size Reduction Based on Feasible Feedback Combinations for Simultaneous Downlink Receptions and/or Group Parity Calculations Initially, a UE (e.g., UE 120 of FIG. 1) may receive a plurality of simultaneous downlink transmissions during a time period, wherein the plurality of simultaneous downlink transmissions received by the UE are less than k (e.g., (k−1) downlink transmissions or (k−2) downlink transmissions). Each of the plurality of simultaneous downlink transmissions may be characterized by a binary vector indicating a corresponding downlink transmission occasion having a weight of (k−1) or (k−2). Because the number of downlink transmissions that are successfully received during a given time period are less than k, there may be at least one downlink transmission that failed.

Thus, in some examples, the UE may generate a HARQ feedback to the base station by calculating a parity value of a first downlink transmission of the plurality of simultaneous downlink transmissions based at least on the binary vector corresponding to the first downlink transmission. The UE may then calculate a summing value based at least on a summation of the parity value with a codeword index of each of the plurality of simultaneous downlink transmissions other than the first downlink transmission. The UE may then transmit the summing value to the base station as a HARQ feedback.

FIG. 7 is a table 700 illustrating an example of codebook sizes based on a combination of the techniques described in FIG. 5 (e.g., feasible combinations) and FIG. 6 (e.g., maximum k encoding), as well as a Hamming distance 3 code. In this example, M=28, and k=4. This may correspond to an example where a UE is configured with four G-RNTIs and seven mini slots (e.g., wherein the UE can simultaneously receive four downlink transmissions over the seven mini slots).

A first row 702 of the table 700 provides a series of different k values, followed by a final entry labeling the last column as directed to a total number of codebook entries and a total number of bits for the codebook entries in parenthesis.

A second row 704 of the table 700 initially starts with a first entry labeling the row as "Feasible Combinations," corresponding to the techniques described above in FIG. 5. At k=0, a total number of binary vector (e.g., codeword) combinations are shown as "1" because the integer equivalent for a binary vector for k=0 is "0." At k=1, a total number of codeword indices required to encode the binary vector combinations are shown as "28" because with M equal to 28, each binary vector is a 28-bit vector, and with k equal to 1, there can only be 28 total combinations where only one of the bits in each binary vector is equal to "1." At k=2, a total number of codeword indices required to encode the binary vector combinations are "378." At k=3, the total number of codeword indices are "3,276." Thus, the final entry of the second row provides the total number of codeword indices (24,158) and in parenthesis, the total number of bits required (14.6) to encode all the binary vector combinations.

A third row 706 of the table 700 initially starts with a first entry labeling the row as "Maximum Encoding," corresponding to the techniques described above in FIG. 6. At k=0, k=1, k=2, and k=3, a total number of binary vector (e.g., codeword) combinations are shown as "*" because the number of codeword indices required to encode the binary vector combinations are the same as the number for Feasible Combinations (e.g., 1, 28, 378, and 3,276, respectively). At k=4, a total number of codeword indices required to encode the binary vector combinations are shown as "1" because although there may be multiple combinations of binary vectors, all of the combinations are mapped to a single codeword index. Thus, the final entry of the second row provides the total number of codeword indices (3,684) and in parenthesis, the total number of bits required (11.8) to encode all the binary vector combinations.

A fourth row 708 of the table 700 initially starts with a first entry labeling the row as "Hamming distance 3 code," corresponding to a technique for using a systemic Hamming code to determine a parity of a binary vector corresponding to a received downlink transmission. In the example shown in FIG. 7, the UE may not perform a Hamming process on binary vectors corresponding to the received downlink transmissions associated with weights k=0, k=1, or k=2, but rather, the UE may use the feasible combinations and maximum k encoding described above with respect to FIGS. 5 and 6.

At k=3 (in this case, k−1), the UE may use a Hamming code to calculate a parity for the M-bit binary vector corresponding to the received downlink transmission. In one example, the UE may select a Hamming code (x, y) from a limited number of Hamming codes (e.g., (63, 57), (40, 28), (31, 26), etc.) based on M. For example, the UE may select a Hamming code having y≥M Then, the UE calculates the parity bits based on Musing Hamming encoding, and transmits the parity to the BS. When the BS receives the parity bits, the BS may recover the received downlink transmission by decoding the transmitted vector using the parity bits using the same Hamming code, and determine which, if any, of the downlink transmissions that were not received by the UE. As shown in FIG. 7, the parity for Hamming code (63, 57) results in a 6-bit parity, having 64 codeword combinations for encoding the received downlink transmission at k=3 and k=4. It should be noted that the 64 codeword combinations include the combinations for k=4 whether or not the UE receives a fourth simultaneous downlink transmission at k=4. Thus, the final entry of the fourth row 708, where a combination of feasible combinations and Hamming distance 3 code are used, the total number of codeword indices (471) and in parenthesis (e.g., 1+28+378+64), the total number of bits required (8.9) to encode all the binary vector combinations are provided.

Figure 8:
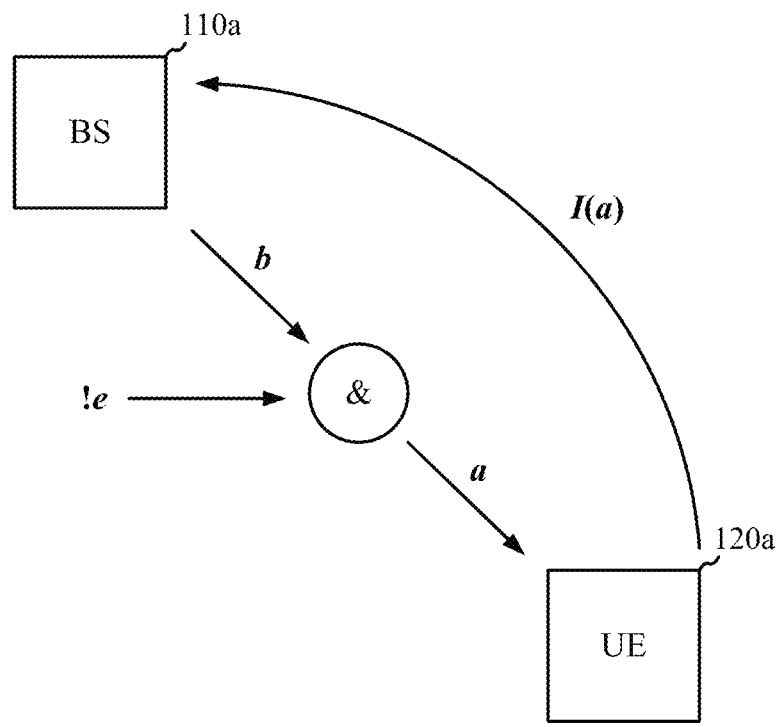
FIG. 8 is a block diagram illustrating an example method for using Hamming encoding between a base station and a UE, in accordance with certain aspects of the present disclosure.

FIG. 8 is a block diagram illustrating an example method for using Hamming encoding between a base station (BS) and a UE (e.g., the BS 110a and UE 120a of FIG. 1). Initially, the BS 110a may transmit downlink data characterized by a binary vector (b) with k or less non-zero entries to the UE 120a. The transmitted downlink data may include multiple simultaneous transmissions. In some cases, the UE 120a may not receive one or more of the multiple simultaneous transmissions, or may not correctly receive an entire downlink transmission. Accordingly, such an error is represented by error vector (e). Thus, if an error occurs, the UE 120a receives a=b & (!e) (note that in this example, errors change a binary element of the downlink vector (b) from "1" to "0").

Because the UE 120a does not know what the original b vector is (e.g., the UE 120a is unaware of the error associated with the received vector a), the UE 120a may have to feedback an index (I(a)) to the BS 110a. In one example, the UE 120a uses the following third equation to determine the index (for the feasible combinations encoding corresponding to FIGS. 5, 6, and row 704 of FIG. 7):

$$I(a) = \begin{cases} T(M, N-1) + \sum_{i=0}^{N-1} \binom{M-a_i}{M-i}, & \text{if } (N < k) \\ T(M, N-1) + 1, & \text{if } (N = k) \end{cases} \quad \text{Equation 3}$$

Here, T represents an index (e.g., index ranging from 0 to 7) that may be configured at the UE 120a by the BS 110a, by another network node, or may be a wireless communication standard. N represents how many downlink transmissions were actually received at the UE 120a. The receive vector a may be defined as $a = \{a_0, \ldots, a_{N-1}\}$, where $N \leq k$, and wherein $a_i < a_{i+1}$. Here, the $\{a_0, \ldots, a_{N-1}\}$ entries are indices of binary vector elements that are equal to "1." With equation 3, a first index may be used for a received vector a that is all zeros (e.g., k=0). The next $$\binom{M}{1} = M$$

indices may be used for feedback vectors corresponding to a received vector a having a weight of one (e.g., k=1). The next $$\binom{M}{2}$$

indices may be used for feedback vectors corresponding to a received vector a having a weight of two (e.g., k=2).

In some examples, a distance 5 code may be used as an alternative, or in addition to, the Hamming distance 3 code. In either case, a threshold k value may trigger the use of one or the other. For example, the Hamming distance 3 code may be used if ($k_{thresh}$=k−1), whereas the distance 5 code may be used if ($k_{thresh}$=k−2).

For example, assuming M=28 and k=7 (e.g., 4G-RNTIs and 7 mini slots, wherein the UE 120a is configured to only receive 7 simultaneous downlink communications). In this example, if the UE 120a uses the Hamming distance 3 code for k=6 (e.g., $k_{thresh}$=k−1), the result is a total of 122,503 combinations using 16.9 bits to encode the received downlink transmissions. However, if the UE 120a alternatively uses the distance 5 code for k=5 (e.g., $k_{thresh}$=k−2), the result is a total of 28,244 combinations using 14.78 bits to encode the received downlink transmissions. Accordingly, the UE 120a may use the distance 5 code instead of the Hamming distance 3 code. It should be noted, that for any given combination of M and k, the UE 120a may be configured to use a function (e.g., Hamming distance 3 code or distance 5 code) that results in the least number of bits to encode the received downlink transmissions. For example, the BS 110a may configure the UE to use a different function for particular M, k values.

Figure 9:
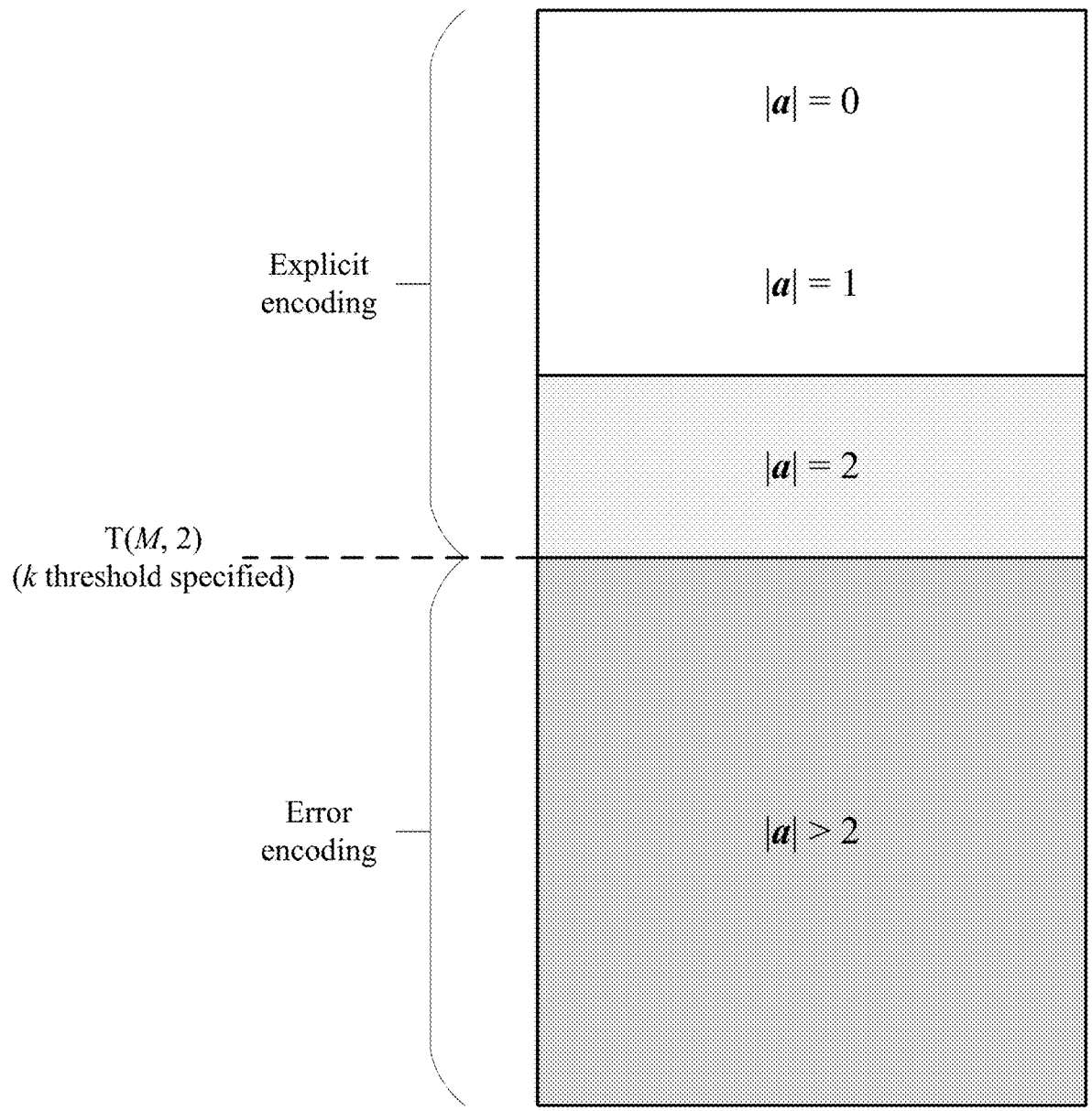
FIG. 9 is a block diagram illustrating an example of a plurality of codewords for k, in accordance with certain aspects of the present disclosure.

In certain aspects, the UE 120a may determine a type of coding based on one or more k thresholds (e.g., $k_{thresh}$ corresponding to a particular coding type (e.g., feasible combinations, maximum k encoding, Hamming distance 3 code, distance 5 code, and any other suitable method of coding described herein or used in the art). FIG. 9 is a block diagram illustrating an example plurality of codewords for k. It should be noted that in the following examples, the UE 120a knows the following: k, M, and a (e.g., a binary vector of a received downlink transmission). In some examples, the type of encoding may be determined by the UE 120a based on the UE's capabilities. Alternatively, the BS 110a or other network node may configure the UE 120a with the type of coding to use, or a wireless standard may provide the type of encoding. In this example, a type of encoding may correspond to each k value.

In the example illustrated in FIG. 9, $k_{thresh}$=3. Initially, for |a|=0, the UE 120a does not receive any downlink transmissions. Accordingly, the UE 120a may transmit a codeword index corresponding to k number of zeros. Similarly, for |a|=1 and =2, the UE 120a may transmit a corresponding codeword index (e.g., the UE 120a may use equation 3 above). However, as shown, if |a|>2, the UE 120a may encode the received vector according to the defined encoding type, and calculate an index (I'(a)) of the encoded vector (e.g., by transforming from parity bits to an integer). The UE may then calculate a codeword (I(a)) for the received vector according to the following equation.

$$I(a) = I'(a) + T(M, k_{cod} - 1) \quad \text{Equation 4}$$

Accordingly, an index from 0 to T (M, $k_{thresh}$−1)−1 refers to an explicit encoding, and an index larger than that to an error encoding. It should be noted that the UE 120a may use multiple threshold values corresponding to multiple types of encoding.

Example Field Approach

In certain aspects, the UE 120a may operate in a finite field having a number of field elements greater than M+1. In the case of M=28, the UE 120a may select a finite field (e.g., Galois field (GF)) having 32 elements, indexed as 0-31. Still using the case of M=28, and also assuming k=4, if the UE 120a receives three simultaneous downlink transmissions (k−1), the UE 120a may determine a corresponding position of each of the downlink transmissions. For example, the UE 120a may index the received downlink transmissions using 0, 1, 2, . . . , M−1. Further, L may refer to the number of bits sent by the UE for HARQ feedback (e.g., L=ceil($\log_2$(M+1))), which is the number of bits necessary to indicate an element of the GF (in this case, a GF of size $2^L$ is selected with a size larger than or equal than M+1). The UE 120a may associate each of the determined positions with an element index of the finite field (e.g., where the three received downlink transmissions map to finite field element indices 1, 3, and 5). It should be noted that the UE 120a may map the determined positions to an equivalent element position in the finite field.

The UE 120a may then sum the three elements of the finite field, and send the total back to the BS 110a. For example, the UE 120a may use the following equation:

$$y = \sum_{j=0}^{k-2} (\alpha^{p_j}) \quad \text{Equation 5}$$

Here, the UE 120a may transmit a finite exponent of y (e.g., the UE 120a may transmit z, for which $a^z$=y) as HARQ feedback. In this example, α is a primitive element in the finite field (e.g., GF($2^L$), and $p_j$ is the position of the $j^{th}$ ACK in the semi-static codebook (e.g., j=0, 1, . . . , k−2). As an alternative to transmitting the finite exponent of y, any other mapping of the 32 GF elements to an integer between 0 and 31 may be used.

In response to receiving the HARQ feedback, the BS 110a may perform the opposite process: The BS 110a may calculate y on its own based on they transmitted by the UE 120a and the binary vector of the simultaneous downlink transmission from the BS 110a.

For example, because the BS 110a knows the number of downlink transmission transport blocks (TBs) is equal to k, and the set (e.g., P{ }) of possible ACK locations in the semi-static codebook is P={$p_0, p_1, \ldots, p_{k-1}$}. The BS 110a also knows that the UE 120a received k−1 downlink transmissions correctly and the value of y. Accordingly, the BS 110a constructs $$\binom{k}{k-1} = k$$

possible subsets of P that could correspond to the k−1 downlink transmissions that the UE received correctly. In this example, $P_1$ is the set with the first ACK missing, $P_2$ is the set with the second ACK missing, and so on until $P_k$ the set with the last ACK missing. Accordingly, the BS 110a calculates $y_1, y_2, \ldots, y_k$ corresponding to $P_1, P_2, \ldots, P_k$ using the following equation.

$$y_i = \Sigma_{p_j \in P_i} \alpha^{p_j} \quad \text{Equation 6}$$

As an alternative to $GF(2^L)$, the UE 120a may perform an operation in GF(X), where X is a number which is a prime power greater than or equal to M+1 (e.g. for M=28 the UE 120a can perform the operations over GF(29)). As yet another alternative, instead of performing the operations on a finite field, the operations may be performed in a group (e.g. $Z_{M+1}$)

For operation in $Z_{M+1}$, the UE 120a may index the possible HARQ feedback positions as 1, 2, 3, . . . , M, then add together the indices of the HARQ feedback entry positions modulo M+1 and send the resulting value (y) to the BS 110a. For example, the UE may use the following equation.

$$y = \sum_{j=0}^{k-2} p_j \bmod(M+1) \quad \text{Equation 7}$$

To obtain the codeword that failed, the base station may compute the difference (modulo M+1) between the locally generated y (e.g., based on the transmitted locations) and the received y.

Example Techniques for Transmitting a HARQ Payload

As noted above with reference to FIGS. 4A and 4B, the UE 120a may be configured to feedback HARQ information corresponding to multiple time periods (e.g., slots) or multiple component carriers. For example, the UE 120a may communicate a single uplink HARQ communication corresponding to a first set of simultaneous downlink communications and a second set of simultaneous downlink communications. Here, each set may be represented as $a_1, \ldots, a_L$, and the corresponding indices as $I(a_1), \ldots, I(a_L)$. In order to map the indices to bits for communication to the BS 110a, two separate approaches may be used.

In a first approach, each of the indices may be separately mapped directly to bits, with each index using the following equation. The UE 120a may then transmit the bits to the BS 110a.

$$\lceil \log_2 T(M,k) \rceil \quad \text{Equation 8}$$

Here, each of the indices are separately mapped to bits, then the corresponding bits for the indices are concatenated into a HARQ feedback payload.

In a second approach, joint encoding between the sets may be used, where encoding is performed jointly across all indices. For example, the UE may use the following equation for joint encoding.

$$I_{TOT}(a_1, \ldots, a_L) = \sum_{i=1}^{L} I(a_i) \prod_{j=1}^{i-1} T(M_j, k_j) \quad \text{Equation 9}$$

In this example, the first index can be determined by (mod T ($M_1, k_1$)), the second index by (mod T ($M_2, k_2$) T ($M_1, k_1$) div T ($M_1, k_1$)), and so on. Here, the total number of bits is $\lceil \log_2 \Sigma T (M_1, k_i) \rceil$. Here, the indices are processed to $I_{TOT}$, then $I_{TOT}$ is converted into bits for a HARQ feedback payload.

Example Techniques for Mapping Multiple Codewords to a Single Index

FIG. 10 is a block diagram illustrating an example codebook 1000 configured based on a maximum number of simultaneous downlink transmissions the UE can receive. The codebook 1000 may be configured for a number (M) of candidate downlink transmission occasions for a time period (e.g., a slot). In the example shown, the codebook 1000 is configured for M=4, but also takes into account the maximum number (k) of simultaneous downlink transmissions the UE can receive during the time period (in this example, k=3).

In this example, multiple codewords are mapped to the same codeword index. For example, given a set of possible binary vectors {$x_1, \ldots, x_N$}, the UE 120a may group them in sets {$S_1, \ldots, S_p$} such that they meet the following conditions (where w(x) denotes the weight of the binary vector x).

$$\forall x_i, x_j \text{ and } x_i \in S_k, w(x_i + x_j) > k \quad \text{Cond. 1}$$

$$\cup_{i=1}^{P} S_i = (x_1, \ldots, x_N), S_i \cap S_j = \emptyset \quad \text{Cond. 2}$$

It should be noted that if $w(x_i + x_j) \leq k$, the vectors cannot be uniquely identified. Also, with regard to condition 1, "+" may be used as the element-wise logical OR (e.g., 1+0=0+1=1+1=1). Based on condition 1 and condition 2, bounds for P can be derived as follows.

$$P \geq \sum_{i=0}^{\lfloor k/2 \rfloor} \binom{M}{i} \quad \text{Equation 10}$$

Here, each of the vectors of weight less than or equal to $\lfloor k/2 \rfloor$ cannot be grouped together because they cannot meet the first condition. Accordingly, there should be at least as many sets as vectors of weight less than or equal to $\lfloor k/2 \rfloor$.

In the example illustrated in FIG. 10, at a given point in time, the BS 110a is only expecting to receive one of codewords 0001 or 1110. That is, these codewords cannot both be right at the same point in time (for both to be possible at the same point in time, the base station would have needed to transmit 1111, which is not feasible in the current example). As such, the UE 120a can send a codeword index (1) that is the same for both. In another example, the BS 110a may send three simultaneous downlink transmissions which should result in a 1110 codeword ACK from the UE 120*a*. However, assuming the UE 120*a* only receives two of the downlink transmissions (e.g., the binary vector the UE 120*a* receives is 1010), the UE 120*a* can send an index for 1010 (7) which is also mapped to 0101. Because the BS 110*a* knows that it didn't send a downlink transmission that would correspond to the last digit in 0101, the BS 110*a* will determine that 1010 is the correct HARQ codeword for (7). In other words, the paired codewords, if added together, would result in 1111, which is not a feasible codeword response for k=3. Accordingly, there is no combination where both codewords of the paired codewords will work for a given point in time.

It should be noted that although FIG. 10 illustrates an example codebook mapping codeword pairs to a shared index where k=3 and M=4, similar codebooks are also contemplated for other values of k and M.

In certain aspects, the UE 120 may determine a total number of bits of an encoded HARQ feedback (e.g., a number of bits in a codeword, binary vector, parity, etc.). When the total number of bits is less than a threshold number of bits, the UE 120*a* may transmit a HARQ binary vector (e.g., a codeword) instead of the encoded HARQ feedback to the base station 110*a*. However, when the total number of bits is greater than a threshold number of bits, the UE 120*a* may transmit the encoded HARQ feedback to the base station 110*a*. If the total number of bits is less than a threshold number of bits, the UE 120*a* may choose to send either the HARQ binary vector or the encoded HARQ feedback.

In certain aspects, the UE 120*a* may use the determined total number of bits to perform one or more of the following: (i) drop one or more channel state information (CSI) reports based at least on the total number of bits, (ii) adjust power for transmission of the HARQ feedback to the base station based at least on the total number of bits, or (iii) determine an uplink resource for transmission of the HARQ feedback based at least on the total number of bits. For example, the power of for transmission may be the power used for transmitting the HARQ feedback over a PUCCH.

Figure 11:
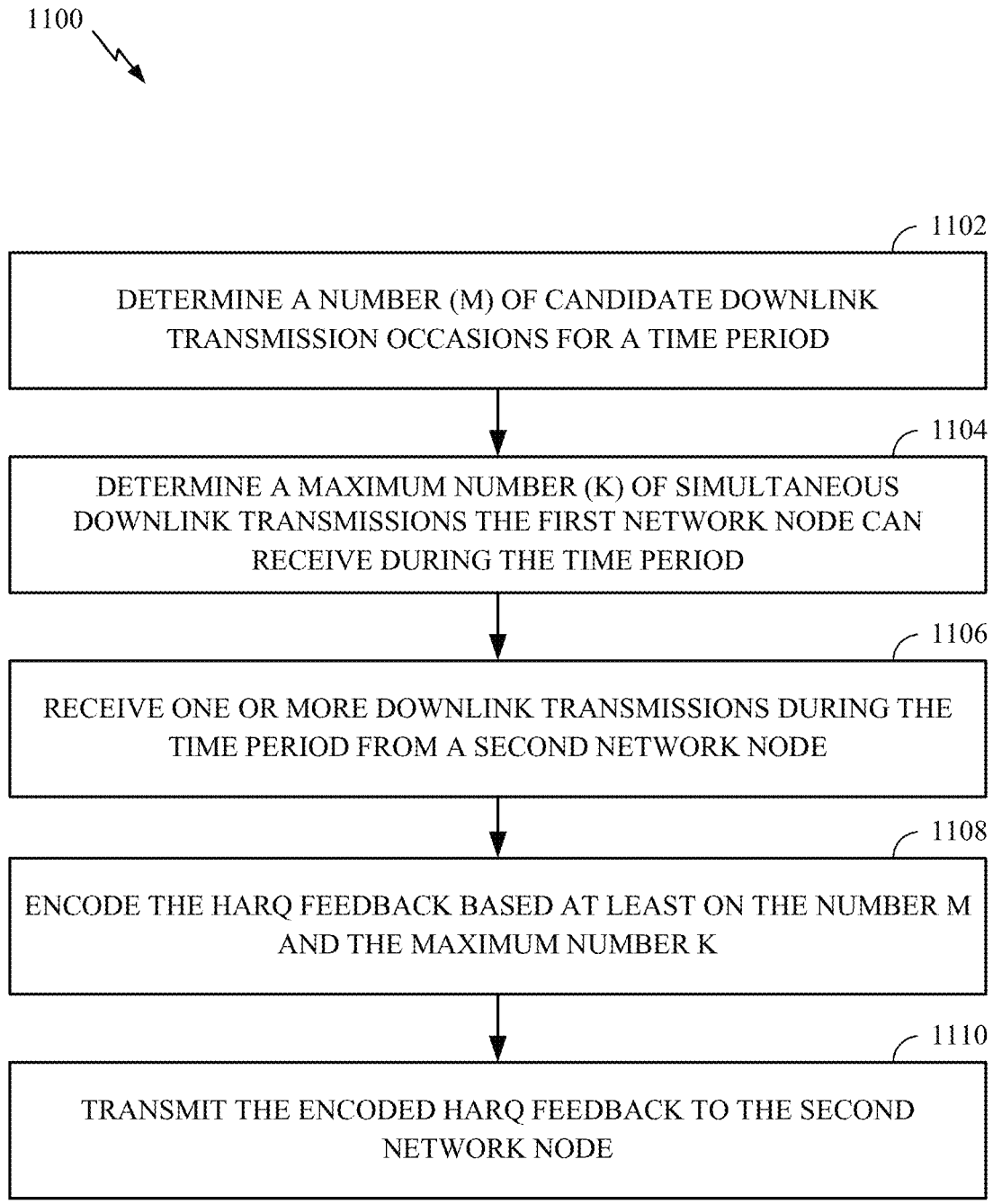
FIG. 11 is a flow diagram illustrating example signaling for HARQ feedback communication, in accordance with aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 120*a* in the wireless communication network 100). The operations 1100 may be complimentary operations by the UE to the operations 1100 performed by the BS. Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at block 1102, by determining a number (M) of candidate downlink transmission occasions for a time period. The operations 1100 may proceed to block 1104 by determining a maximum number (k) of simultaneous downlink transmissions the UE can receive during the time period. The operations 1100 may proceed to block 1106 by receiving one or more downlink transmissions during the time period from a second network node. The operations 1100 may proceed to block 1108 by encoding hybrid automatic repeat request (HARQ) feedback based at least on the number M and the maximum number k. The operations 1100 may proceed to block 1110 by transmitting the encoded HARQ feedback to a second network node.

In certain aspects, encoding the HARQ feedback further comprises encoding the HARQ feedback based at least on a quantity of the one or more downlink transmissions received.

In certain aspects, wherein encoding the HARQ feedback comprises selecting a HARQ codeword index from a plurality of HARQ codeword indices, wherein each HARQ codeword index in the plurality of HARQ codeword indices corresponds to one of a plurality of binary vectors, each of the plurality of binary vectors comprising M elements and weight less than or equal to k, and wherein the encoded HARQ feedback comprises the selected HARQ codeword index.

In certain aspects, each of the received one or more downlink transmissions is characterized by at least one binary vector of the plurality of binary vectors indicating a corresponding downlink transmission occasion, and wherein the encoding the HARQ feedback further comprises: calculating a resulting binary vector for all of the one or more downlink transmissions based at least at least on the binary vector of each of the one or more downlink transmissions, wherein the selected HARQ codeword index is mapped to the resulting binary vector.

In certain aspects, wherein the plurality of HARQ codeword indices includes at least one HARQ codeword index corresponding to one of the plurality of binary vectors, wherein the one of the plurality of binary vectors comprises M elements and a weight equal to k.

In certain aspects, the one or more downlink transmissions are a plurality of simultaneous downlink transmissions and total less than k downlink transmissions, wherein each of the one or more downlink transmissions is characterized by at least one binary vector of a plurality of binary vectors indicating a corresponding downlink transmission occasion, and wherein the encoding the HARQ feedback further comprises: selecting a HARQ codeword index from a plurality of HARQ codeword indices, wherein each HARQ codeword index in the plurality of HARQ codeword indices corresponds to one of the plurality of binary vectors, each of the plurality of binary vectors comprising M elements and weight less than or equal to k; and calculating a parity value of a first downlink transmission of the one or more downlink transmissions based at least on the binary vector corresponding to the first downlink transmission, wherein the encoded HARQ feedback comprises the selected HARQ codeword index and the parity value.

In certain aspects, operation 1100 include calculating a summing value comprising a summation of the parity value with a combinatorial index of each of the one or more simultaneous downlink transmissions other than the first downlink transmission, and wherein the encoded HARQ feedback comprises the summing value.

In certain aspects, wherein calculating the parity value of the first downlink transmission comprises calculating the parity value using one of a Hamming encoding or a distance encoding.

In certain aspects, the one or more downlink transmissions are a plurality of simultaneous downlink transmissions and total (k−1) downlink transmissions, wherein each of the one or more downlink transmissions is characterized by at least one binary vector of a plurality of binary vectors indicating a corresponding downlink transmission occasion, and wherein encoding the HARQ feedback comprises: determining a finite field having a number of field elements greater than M; and wherein encoding the HARQ feedback further comprises: associating the corresponding downlink transmission occasion of each of the one or more downlink transmissions with a field element in the number of field elements; and calculating a summing value comprising a summation of the field elements associated with each of the one or more downlink transmissions, wherein the encoded HARQ feedback comprises the summing value.

In certain aspects, the one or more downlink transmissions are a plurality of simultaneous downlink transmissions and total (k−1) downlink transmissions, wherein each of the one or more downlink transmissions is characterized by at least one binary vector of a plurality of binary vectors indicating a corresponding downlink transmission occasion, and wherein encoding the HARQ feedback further comprises: associating the corresponding downlink transmission occasion of each of the one or more downlink transmissions with an index value; and calculating a summing value comprising a summation of index values associated with each of the one or more simultaneous downlink transmissions, and wherein the encoded HARQ feedback comprises the summing value.

In certain aspects, calculating the summing value further comprises: calculating a sum of index values associated with each of the one or more downlink transmissions; and calculating modulo (M+1) of the sum of index values, wherein the encoded HARQ feedback comprises the calculated modulo (M+1) of the sum of index values.

In certain aspects, the operations 1100 include: selecting a HARQ codeword index from a plurality of HARQ codeword indices to encode the HARQ feedback; and encoding the HARQ feedback according to the selected HARQ codeword index, wherein: each HARQ codeword index in the plurality of HARQ codeword indices corresponds to one of a plurality of binary vectors with M elements having weight less than or equal to k; and a logical OR operation on a given two binary vectors of the plurality of binary vectors corresponding to each HARQ codeword index results in a binary vector having weight greater than k.

In certain aspects, the operations 1100 include: determining a total number of bits of the encoded HARQ feedback; when the total number of bits is less than a threshold number of bits, transmitting a HARQ binary vector instead of the encoded HARQ feedback to the second network node; and when the total number of bits is greater than the threshold number of bits, transmitting the encoded HARQ feedback to the second network node.

In certain aspects, the operations 1100 further include determining a total number of bits of the encoded HARQ feedback, wherein based at least on the total number of bits, the operations further include: dropping one or more channel state information (CSI) reports based at least on the total number of bits; adjusting power for transmission of the HARQ feedback to the second network node based at least on the total number of bits; or determining an uplink resource for transmission of the HARQ feedback based at least on the total number of bits.

Figure 12:
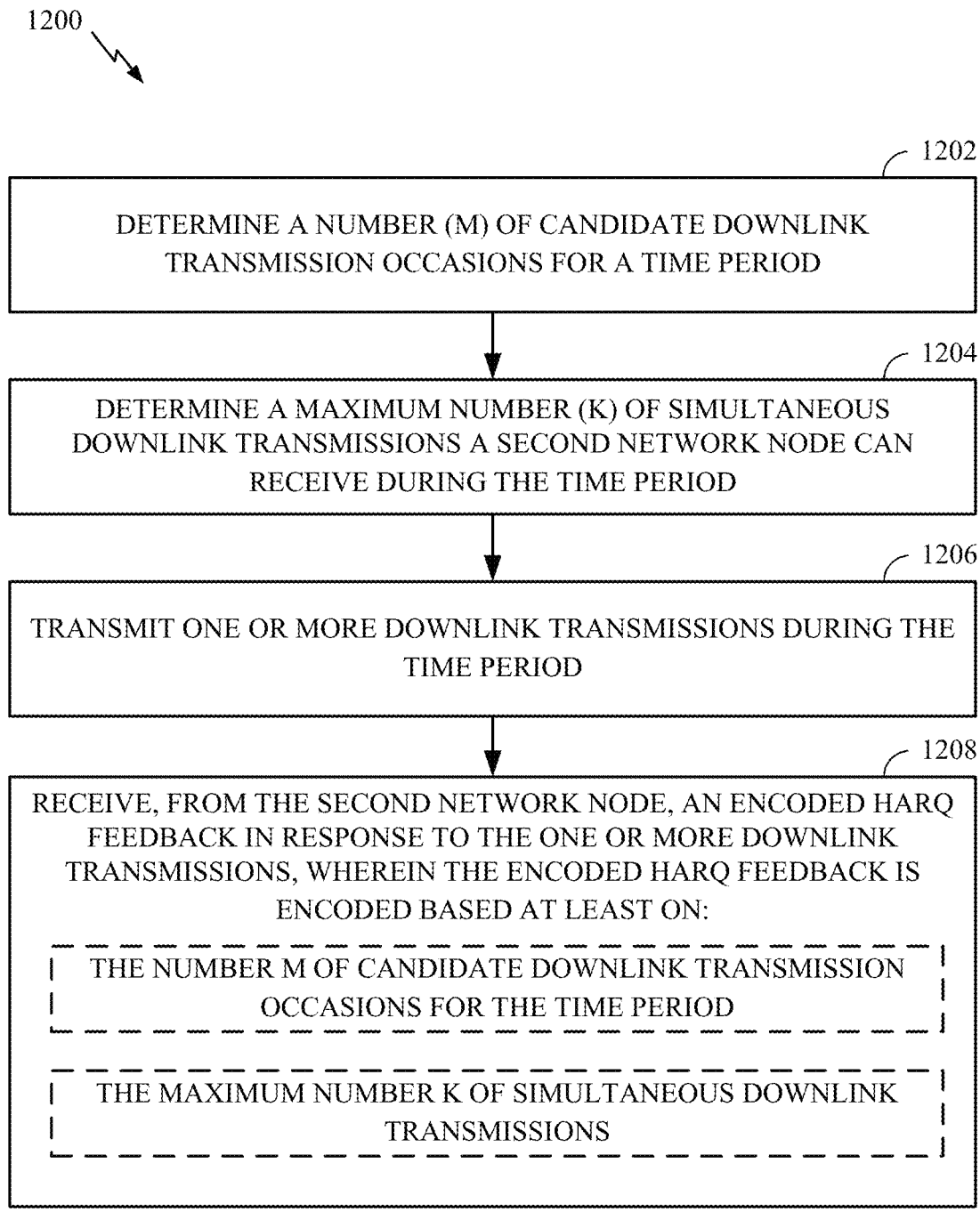
FIG. 12 is a flow diagram illustrating example signaling for HARQ feedback communication, in accordance with aspects of the present disclosure.

FIG. 12 is a flow diagram illustrating example operations 1200 for wireless communication, in accordance with certain aspects of the present disclosure. The operations 1200 may be performed, for example, by a BS (e.g., such as the BS 110a in the wireless communication network 100). The operations 1200 may be complimentary operations by the BS to the operations 1200 performed by the UE. Operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 may begin, at block 1202, by determining a number (M) of candidate downlink transmission occasions for a time period. The operations 1200 may proceed to block 1204 by determining a maximum number (k) of simultaneous downlink transmissions a user equipment (UE) can receive during the time period. The operations 1200 may proceed to block 1206 by transmitting one or more downlink transmissions during the time period. The operations 1200 may proceed to block 1208 by receiving, from the second network node, an encoded HARQ feedback in response to the one or more downlink transmissions, wherein the encoded HARQ feedback is encoded based at least on: the number M of candidate downlink transmission occasions for the time period, and the maximum number k of simultaneous downlink transmissions.

In certain aspects, the encoded HARQ feedback comprises a HARQ codeword index from a plurality of HARQ codeword indices, wherein each HARQ codeword index in the plurality of HARQ codeword indices corresponds to one of a plurality of binary vectors, each of the plurality of binary vectors comprising M elements and weight less than or equal to k.

In certain aspects, the plurality of HARQ codeword indices includes at least one HARQ codeword index corresponding to one of the plurality of binary vectors, wherein the one of the plurality of binary vectors comprises M elements and a weight equal to k.

In certain aspects, the encoded HARQ feedback comprises a value based at least on a summation of a parity value of a first downlink transmission of the one or more downlink transmissions with a combinatorial index of each of the one or more downlink transmissions other than the first downlink transmission, and the processor is configured to subtract the combinatorial index of each of the one or more downlink transmissions other than the first downlink transmission from the value to determine the parity value.

Figure 13:
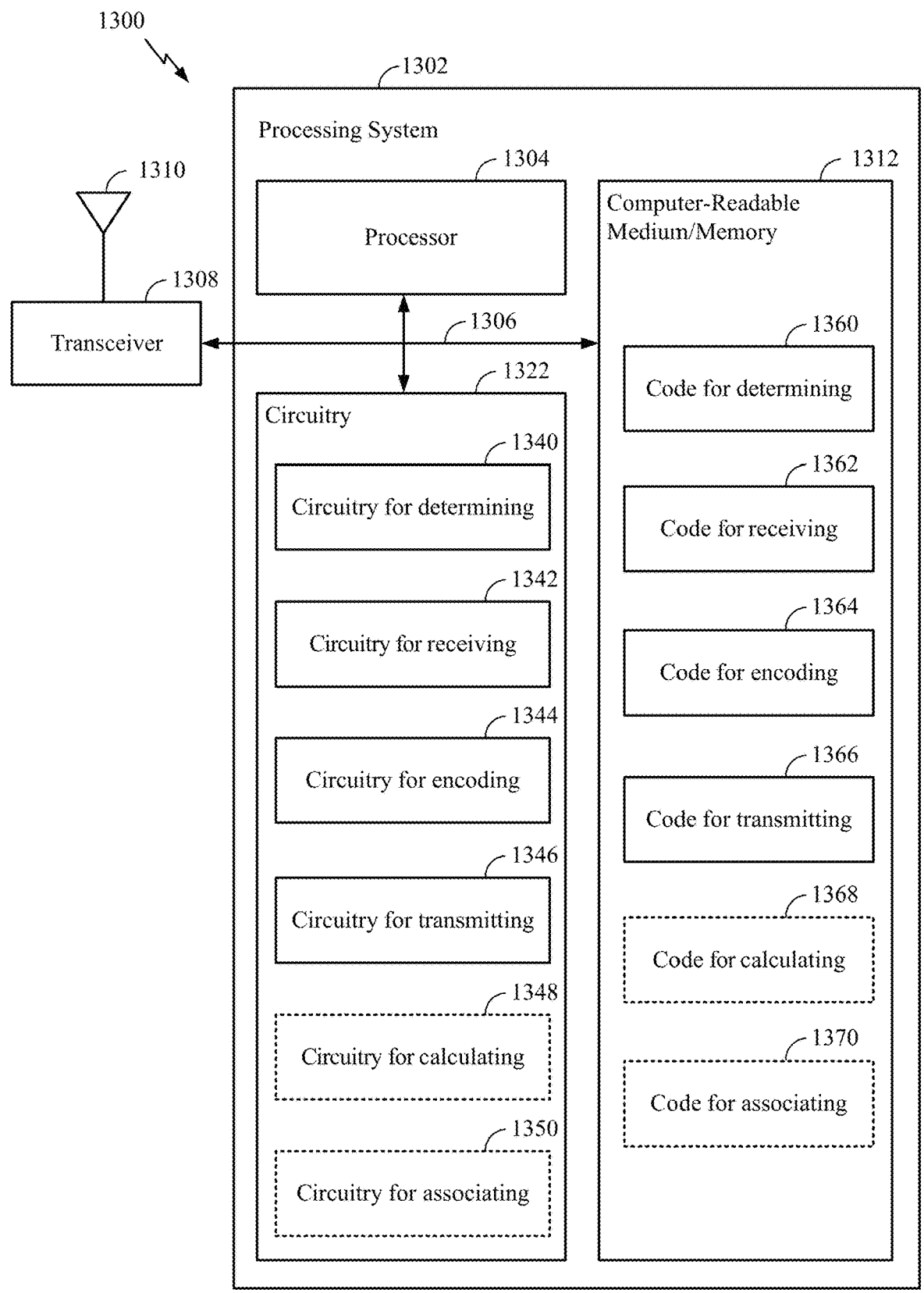
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein.

In certain aspects, computer-readable medium/memory 1312 stores code 1360 for determining a number (M) of candidate downlink transmission occasions for a time period, and determining a maximum number (k) of simultaneous downlink transmissions the first network node can receive during the time period. Computer-readable medium/memory 1312 may also store code 1362 for receiving one or more downlink transmissions during the time period from a second network node. Computer-readable medium/memory 1312 may also store code 1364 for encoding the HARQ feedback based at least on the number M and the maximum number k. Computer-readable medium/memory 1312 may also store code 1366 for transmitting the encoded HARQ feedback to the second network node.

The computer-readable medium/memory 1312 may optionally store code 1368 for calculating a resulting binary vector for all of the one or more downlink transmissions based at least on the binary vector of each of the one or more downlink transmissions, wherein the selected HARQ codeword index is mapped to the resulting binary vector. Code 1368 may also be used for calculating a parity value of a first downlink transmission of the one or more downlink transmissions based at least on the binary vector corresponding to the first downlink transmission, wherein the encoded HARQ feedback comprises the selected HARQ codeword index and the parity value, and calculating a summing value comprising a summation of the parity value with a combinatorial index of each of the one or more simultaneous downlink transmissions other than the first downlink transmission, and wherein the encoded HARQ feedback comprises the summing value.

The computer-readable medium/memory 1312 may optionally store code 1370 for associating the corresponding downlink transmission occasion of each of the one or more downlink transmissions with a field element in the number of field elements. Code 1370 may also be used for associate the corresponding downlink transmission occasion of each of the one or more downlink transmissions with an index value.

In certain aspects, the processor 1304 has circuitry 1322 configured to implement the code stored in the computer-readable medium/memory 1312. In certain aspects, the processing system 1302 includes circuitry 1340 for determining a number (M) of candidate downlink transmission occasions for a time period, and determining a maximum number (k) of simultaneous downlink transmissions the first network node can receive during the time period. In certain aspects, the processing system 1302 includes circuitry 1342 for receiving one or more downlink transmissions during the time period from a second network node. In certain aspects, the processing system 1302 includes circuitry 1344 for encoding hybrid automatic repeat request (HARQ) feedback based at least on the number M and the maximum number k. In certain aspects, the processing system 1302 includes circuitry 1346 for transmitting the encoded HARQ feedback to the second network node.

In certain aspects, the processing system 1302 includes circuitry 1348 for calculating a resulting binary vector for all of the one or more downlink transmissions based at least on the binary vector of each of the one or more downlink transmissions, wherein the selected HARQ codeword index is mapped to the resulting binary vector. Circuitry 1348 may also be used for calculating a parity value of a first downlink transmission of the one or more downlink transmissions based at least on the binary vector corresponding to the first downlink transmission, wherein the encoded HARQ feedback comprises the selected HARQ codeword index and the parity value, and calculating a summing value comprising a summation of the parity value with a combinatorial index of each of the one or more simultaneous downlink transmissions other than the first downlink transmission, and wherein the encoded HARQ feedback comprises the summing value.

In certain aspects, the processing system 1302 includes circuitry 1350 for associating the corresponding downlink transmission occasion of each of the one or more downlink transmissions with a field element in the number of field elements. Circuitry 1350 may also be used for associate the corresponding downlink transmission occasion of each of the one or more downlink transmissions with an index value.

Various components of communications device 1300 may provide means for performing the methods and operations described herein, including with respect to FIG. 11.

In some examples, means for transmitting or sending (or means for outputting for transmission) may include the transceivers 254 and/or antenna(s) 252 of the user equipment 120a illustrated in FIG. 2, and/or the transceiver 1308, the antenna 1310, and/or the circuitry for transmitting 1346 of the communication device 1300 in FIG. 13.

In some examples, means for receiving (or means for obtaining) may include the transceivers 254 and/or antenna(s) 252 of the user equipment 120a illustrated in FIG. 2 and/or the transceiver 1308, the antenna 1310, and/or the circuitry for receiving 1342 of the communication device 1300 in FIG. 13.

In some examples, means for determining, means for encoding, means for calculating, means for associating, means for performing, etc., may include various processing system components, such as: the one or more processors 1302 in FIG. 13, or aspects of the user equipment 120a depicted in FIG. 2, including receive processor 258, transmit processor 264, TX MIMO processor 266, and/or controller/processor 280 (including HARQ manager 122).

Notably, FIG. 13 is an example, and many other examples and configurations of communication device 1300 are possible.

Figure 14:
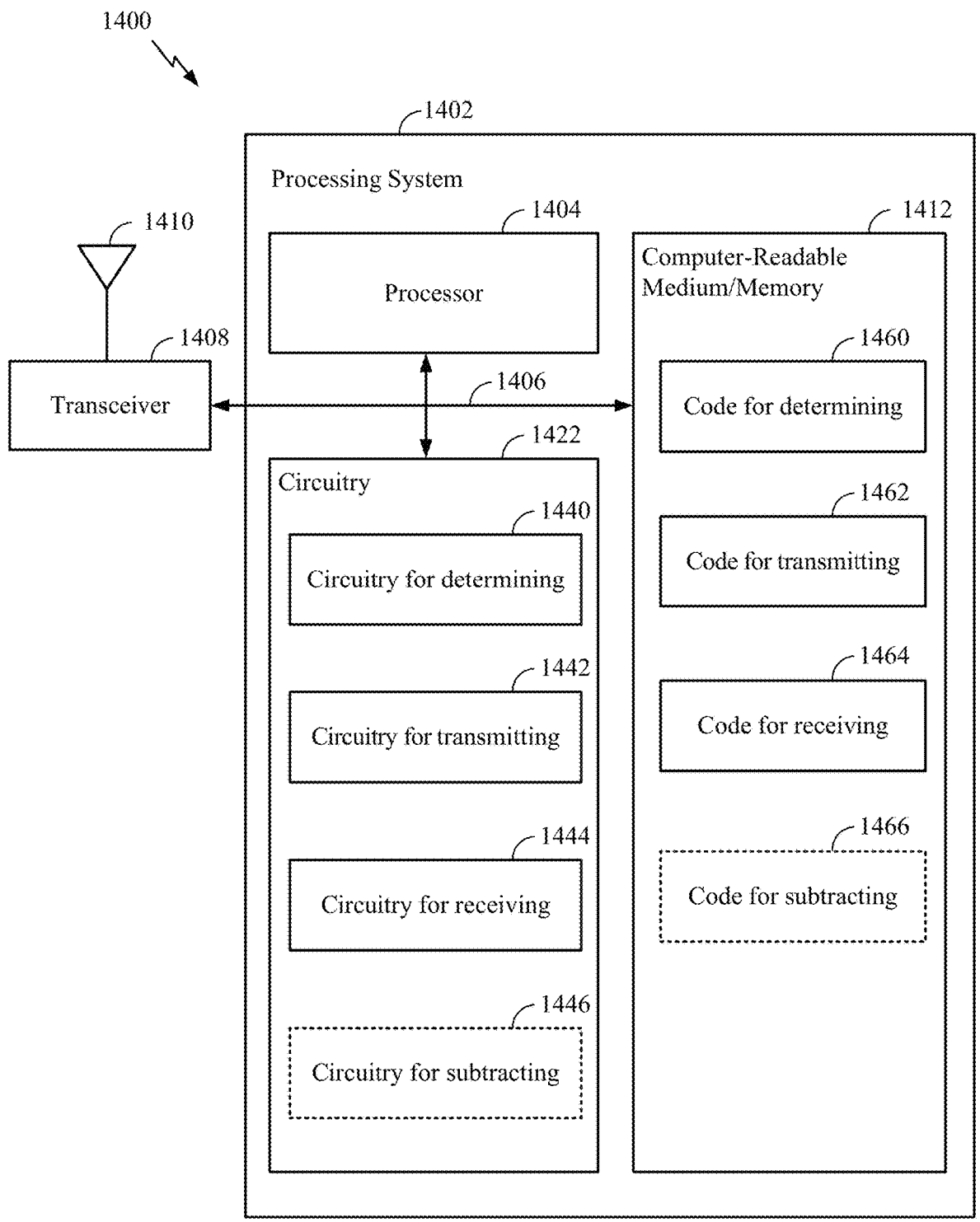
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 14. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein.

In certain aspects, computer-readable medium/memory 1412 stores code 1460 for determining a number (M) of candidate downlink transmission occasions for a time period, and determining a maximum number (k) of simultaneous downlink transmissions a second network node can receive during the time period. Computer-readable medium/memory 1412 also stores code 1462 for transmitting one or more downlink transmissions during the time period. Computer-readable medium/memory 1412 also stores code 1464 for receiving, from the second network node, an encoded HARQ feedback in response to the one or more downlink transmissions, the HARQ feedback encoded based at least on: the number M of candidate downlink transmission occasions for the time period, and the maximum number k of simultaneous downlink transmissions.

In some examples, computer-readable medium/memory 1412 may optionally store code 1466 for subtracting the combinatorial index of each of the one or more downlink transmissions other than the first downlink transmission from the value to determine the parity value.

In certain aspects, the processor 1404 has circuitry 1422 configured to implement the code stored in the computer-readable medium/memory 1412. The processor 1404 includes circuitry 1440 for determining a number (M) of candidate downlink transmission occasions for a time period and determining a maximum number (k) of simultaneous downlink transmissions a second network node can receive during the time period. The processor 1404 includes circuitry 1442 for transmitting one or more downlink transmissions during the time period. The processor 1404 includes circuitry 1444 for receiving, from the second network node, an encoded HARQ feedback in response to the one or more downlink transmissions, the HARQ feedback encoded based at least on: the number M of candidate downlink transmission occasions for the time period, and the maximum number k of simultaneous downlink transmissions.

In some examples, the processor 1404 may optionally include circuitry 1446 for subtracting the combinatorial index of each of the one or more downlink transmissions other than the first downlink transmission from the value to determine the parity value.

Various components of communications device 1400 may provide means for performing the methods and operations described herein, including with respect to FIG. 12.

In some examples, means for transmitting or sending (or means for outputting for transmission) may include the transceivers 232 and/or antenna(s) 234 of the base station 110a illustrated in FIG. 2, and/or the transceiver 1408, the antenna 1410, and/or the circuitry for transmitting 1442 of the communication device 1400 in FIG. 14.

In some examples, means for receiving (or means for obtaining) may include the transceivers 232 and/or antenna(s) 234 of the base station 110a illustrated in FIG. 14, and/or the transceiver 1408, the antenna 1410, and/or the circuitry for receiving 1444 of the communication device 1400 in FIG. 14.

In some examples, means for determining, subtracting, calculating, associating, performing, etc., may include various processing system components, such as: the one or more processors 1402 in FIG. 14, or aspects of the base station 110a depicted in FIG. 2, including receive processor 238, transmit processor 220, TX MIMO processor 230, and/or controller/processor 240 (including the HARQ manager 112).

Notably, FIG. 14 is an example, and many other examples and configurations of communication device 1400 are possible.

Example Aspects

In a first aspect, a method for wireless communication, comprising: determining a number (M) of candidate downlink transmission occasions for a time period; determining a maximum number (k) of simultaneous downlink transmissions the first network node can receive during the time period; receiving one or more downlink transmissions during the time period from a second network node; encoding hybrid automatic repeat request (HARQ) feedback based at least on the number M and the maximum number k; and transmitting the encoded HARQ feedback to the second network node.

In a second aspect, in combination with the first aspect, wherein the method further comprises encoding the HARQ feedback based at least on a quantity of the one or more downlink transmissions received.

In a third aspect, in combination with any one or more of the first aspect and second aspect, wherein encoding the HARQ feedback further comprises selecting a HARQ codeword index from a plurality of HARQ codeword indices, wherein: each HARQ codeword index in the plurality of HARQ codeword indices corresponds to one of a plurality of binary vectors, each of the plurality of binary vectors comprising M elements and weight less than or equal to k, and the encoded HARQ feedback comprises the selected HARQ codeword index.

In a fourth aspect, in combination with any one or more of the first aspect through the third aspect, wherein each of the received one or more downlink transmissions is characterized by at least one binary vector of the plurality of binary vectors indicating a corresponding downlink transmission occasion, and wherein encoding the HARQ feedback further comprises: calculating a resulting binary vector for all of the one or more downlink transmissions based at least on the binary vector of each of the one or more downlink transmissions, wherein the selected HARQ codeword index is mapped to the resulting binary vector.

In a fifth aspect, in combination with any one or more of the first aspect through the fourth aspect, wherein the plurality of HARQ codeword indices includes at least one HARQ codeword index corresponding to one of the plurality of binary vectors, wherein the one of the plurality of binary vectors comprises M elements and a weight equal to k.

In a sixth aspect, in combination with any one or more of the first aspect through the fifth aspect, wherein the one or more downlink transmissions are received simultaneously and total less than k downlink transmissions, wherein each of the one or more simultaneously received downlink transmissions is characterized by at least one binary vector of a plurality of binary vectors indicating a corresponding downlink transmission occasion, and wherein encoding the HARQ feedback comprises: selecting a HARQ codeword index from a plurality of HARQ codeword indices for encoding the HARQ feedback, wherein each HARQ codeword index in the plurality of HARQ codeword indices corresponds to one of the plurality of binary vectors, each of the plurality of binary vectors comprising M elements and weight less than or equal to k; and calculating a parity value of a first downlink transmission of the one or more simultaneously received downlink transmissions based at least on the binary vector corresponding to the first downlink transmission, wherein transmitting the HARQ feedback to the second network node comprises transmitting the selected HARQ codeword index and the parity value to the second network node.

In a seventh aspect, in combination with any one or more of the first aspect through the sixth aspect, wherein encoding the HARQ feedback further comprises: calculating a summing value comprising a summation of the parity value with a combinatorial index of each of the one or more downlink transmissions other than the first downlink transmission, wherein the encoded HARQ feedback comprises the summing value.

In an eighth aspect, in combination with any one or more of the first aspect through the seventh aspect, wherein calculating the parity value of the first downlink transmission comprises calculating the parity value using one of a Hamming encoding or a distance encoding.

In a ninth aspect, in combination with any one or more of the first aspect through the eighth aspect, wherein the one or more downlink transmissions are a plurality of simultaneous downlink transmissions and total (k−1) downlink transmissions, wherein each of the one or more downlink transmissions is characterized by at least one binary vector of a plurality of binary vectors indicating a corresponding downlink transmission occasion, and wherein encoding the HARQ feedback further comprises: determining a finite field having a number of field elements greater than M; and wherein encoding the HARQ feedback further comprises: associating the corresponding downlink transmission occasion of each of the one or more downlink transmissions with a field element in the number of field elements; and calculating a summing value comprising a summation of the field elements associated with each of the one or more downlink transmissions, wherein the encoded HARQ feedback comprises the summing value.

In a tenth aspect, in combination with any one or more of the first aspect through the ninth aspect, wherein the one or more downlink transmissions are a plurality of simultaneous downlink transmissions and total (k−1) downlink transmissions, wherein each of the one or more downlink transmissions is characterized by at least one binary vector of a plurality of binary vectors indicating a corresponding downlink transmission occasion, an wherein encoding the HARQ feedback further comprises: associating the corresponding downlink transmission occasion of each of the one or more downlink transmissions with an index value; and calculating a summing value comprising a summation of index values associated with each of the one or more downlink transmissions, and wherein the encoded HARQ feedback comprises the summing value.

In an eleventh aspect, in combination with any one or more of the first aspect through the tenth aspect, wherein calculating the summing value further comprises: calculating a sum of index values associated with each of the one or more simultaneous downlink transmissions; and calculating modulo (M+1) of the sum of index values, wherein the encoded HARQ feedback comprises the calculated modulo (M+1) of the sum of index values.

In a twelfth aspect, in combination with any one or more of the first aspect through the eleventh aspect, wherein encoding the HARQ feedback further comprises: selecting a HARQ codeword index from a plurality of HARQ codeword indices to encode the HARQ feedback; and encoding the HARQ feedback according to the selected HARQ codeword index, wherein: each HARQ codeword index in the plurality of HARQ codeword indices corresponds to one of a plurality of binary vectors with M elements having weight less than or equal to k; and a logical OR operation on a given two binary vectors of the plurality of binary vectors corresponding to each HARQ codeword index results in a binary vector having weight greater than k.

In a thirteenth aspect, in combination with any one or more of the first aspect through the twelfth aspect, wherein transmitting the HARQ feedback further comprises: determining a total number of bits of the encoded HARQ feedback; when the total number of bits is less than a threshold number of bits, transmitting a HARQ binary vector instead of the encoded HARQ feedback to the second network node; and when the total number of bits is greater than the threshold number of bits, transmitting the encoded HARQ feedback to the second network node.

In a fourteenth aspect, in combination with any one or more of the first aspect through the thirteenth aspect, wherein the method further comprises: determining a total number of bits of the encoded HARQ feedback, wherein based at least on the total number of bits, the method further comprises: dropping one or more channel state information (CSI) reports based at least on the total number of bits; adjusting power for transmission of the encoded HARQ feedback to the second network node based at least on the total number of bits; or determining an uplink resource for transmission of the encoded HARQ feedback based at least on the total number of bits.

In a fifteenth aspect, a method of wireless communication performed by a first network node, the method comprising: determining a number (M) of candidate downlink transmission occasions for a time period; determining a maximum number (k) of simultaneous downlink transmissions a second network node can receive during the time period; transmitting one or more downlink transmissions during the time period; and receiving, from the second network node, an encoded HARQ feedback in response to the one or more downlink transmissions, wherein the encoded HARQ feedback is encoded based at least on: the number M of candidate downlink transmission occasions for the time period, and the maximum number k of simultaneous downlink transmissions.

In a sixteenth aspect, in combination with the fifteenth aspect, wherein the encoded HARQ feedback comprises a HARQ codeword index from a plurality of HARQ codeword indices, wherein: each HARQ codeword index in the plurality of HARQ codeword indices corresponds to one of a plurality of binary vectors, each of the plurality of binary vectors comprising M elements and weight less than or equal to k.

In a seventeenth aspect, in combination with any one or more of the fifteenth aspect and the sixteenth aspect, wherein the plurality of HARQ codeword indices includes at least one HARQ codeword index corresponding to one of the plurality of binary vectors, wherein the one of the plurality of binary vectors comprises M elements and a weight equal to k.

In an eighteenth aspect, in combination with any one or more of the fifteenth aspect through the seventeenth aspect, wherein: the encoded HARQ feedback comprises a value based at least on a summation of a parity value of a first downlink transmission of the one or more downlink transmissions with a combinatorial index of each of the one or more downlink transmissions other than the first downlink transmission, and the method further comprises subtracting the combinatorial index of each of the one or more downlink transmissions other than the first downlink transmission from the value to determine the parity value.

In a nineteenth aspect, an apparatus, comprising: a memory comprising executable instructions; one or more processors configured to execute the executable instructions and cause the apparatus to perform a method in accordance with any one of the first through fourteenth aspects.

In a twentieth aspect, an apparatus, comprising: a memory comprising executable instructions; one or more processors configured to execute the executable instructions and cause the apparatus to perform a method in accordance with any one of the fifteenth through eighteenth aspects.

In a twenty-first aspect, an apparatus, comprising means for performing a method in accordance with any one of the first through fourteenth aspects.

In a twenty-second aspect, an apparatus, comprising means for performing a method in accordance with any one of the fifteenth through eighteenth aspects.

In a twenty-third aspect, a non-transitory computer-readable medium comprising executable instructions that, when executed by one or more processors of an apparatus, cause the apparatus to perform a method in accordance with any one of the first through fourteenth aspects.

In a twenty-fourth aspect, a non-transitory computer-readable medium comprising executable instructions that, when executed by one or more processors of an apparatus, cause the apparatus to perform a method in accordance with any one of the fifteenth through eighteenth aspects.

In a twenty-fifth aspect, a computer program product embodied on a computer-readable storage medium comprising code for performing a method in accordance with any one of the first through fourteenth aspects.

In a twenty-sixth aspect, a computer program product embodied on a computer-readable storage medium comprising code for performing a method in accordance with any one of the fifteenth through eighteenth aspects.

Additional Information

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first network node for wireless communication, comprising:
a processing system configured to:
  determine a number (M) of candidate downlink transmission occasions for a time period;
  determine a maximum number (k) of simultaneous downlink transmissions the first network node can receive during the time period;
  receive one or more downlink transmissions during the time period from a second network node;
  encode hybrid automatic repeat request (HARQ) feedback based at least on the number M and the maximum number k, wherein, to encode the HARQ feedback, the processing system is configured to select a HARQ codeword index from a plurality of HARQ codeword indices, wherein each HARQ codeword index in the plurality of HARQ codeword indices corresponds to a respective binary vector of a plurality of binary vectors, and wherein each binary vector of the plurality of binary vectors comprises M elements and a respective weight less than or equal to k, and
  transmit the encoded HARQ feedback to the second network node, wherein the encoded HARQ feedback comprises the selected HARQ codeword index.

2. The first network node of claim 1, wherein the processing system is further configured to encode the HARQ feedback based at least on a quantity of the one or more downlink transmissions.

3. The first network node of claim 1, wherein each downlink transmission of the one or more downlink transmissions is characterized by at least one binary vector of the plurality of binary vectors indicating a corresponding downlink transmission occasion, and wherein, to encode the HARQ feedback, the processing system is configured to:
  calculate a resulting binary vector for all of the one or more downlink transmissions based at least on the binary vector of each downlink transmission of the one or more downlink transmissions, wherein the selected HARQ codeword index is mapped to the resulting binary vector.

4. The first network node of claim 1, wherein the plurality of HARQ codeword indices includes at least one HARQ codeword index corresponding to one of the plurality of binary vectors, and wherein the one of the plurality of binary vectors comprises M elements and a weight equal to k.

5. A first network node for wireless communication, comprising:
a processing system configured to:
  determine a number (M) of candidate downlink transmission occasions for a time period;
  determine a maximum number (k) of simultaneous downlink transmissions the first network node can receive during the time period;
  receive one or more downlink transmissions during the time period from a second network node;
  encode hybrid automatic repeat request (HARQ) feedback based at least on the number M and the maximum number k; and
  transmit the encoded HARQ feedback to the second network node, wherein the one or more downlink transmissions are a plurality of simultaneous downlink transmissions and total less than k downlink transmissions, wherein each downlink transmission of the one or more downlink transmissions is characterized by at least one binary vector of a plurality of binary vectors indicating a corresponding downlink transmission occasion, and wherein, to encode the HARQ feedback, the processing system is configured to:
    select a HARQ codeword index from a plurality of HARQ codeword indices, wherein each HARQ codeword index in the plurality of HARQ codeword indices corresponds to a respective binary vector of the plurality of binary vectors, and wherein each binary vector of the plurality of binary vectors comprises M elements and a respective weight less than or equal to k, and calculate a parity value of a first downlink transmission of the one or more downlink transmissions based at least on the binary vector corresponding to the first downlink transmission, wherein the encoded HARQ feedback comprises the selected HARQ codeword index and the parity value.

6. The first network node of claim 5, wherein, to encode the HARQ feedback, the processing system is configured to calculate a summing value comprising a summation of the parity value with a combinatorial index of each downlink transmission of the one or more downlink transmissions other than the first downlink transmission, and wherein the encoded HARQ feedback comprises the summing value.

7. The first network node of claim 5, wherein, to calculate the parity value of the first downlink transmission, the processing system is configured to calculate the parity value using one of a Hamming encoding or a distance encoding.

8. A first network node for wireless communication, comprising:
a processing system configured to:
determine a number (M) of candidate downlink transmission occasions for a time period;
determine a maximum number (k) of simultaneous downlink transmissions the first network node can receive during the time period;
receive one or more downlink transmissions during the time period from a second network node;
encode hybrid automatic repeat request (HARQ) feedback based at least on the number M and the maximum number k; and
transmit the encoded HARQ feedback to the second network node, wherein the one or more downlink transmissions are a plurality of simultaneous downlink transmissions and total (k−1) downlink transmissions, wherein each downlink transmission of the one or more downlink transmissions is characterized by at least one binary vector of a plurality of binary vectors indicating a corresponding downlink transmission occasion, and wherein, to encode the HARQ feedback, the processing system is configured to:
associate the corresponding downlink transmission occasion of each downlink transmission of the one or more downlink transmissions with a respective index value; and
calculate a respective summing value comprising a summation of index values associated with each of the one or more downlink transmissions, and wherein the encoded HARQ feedback comprises the summing value.

9. The first network node of claim 8, wherein, to calculate the summing value, the processing system is configured to:
calculate a sum of index values associated with each downlink transmission of the one or more downlink transmissions; and
calculate modulo (M+1) of the sum of index values, wherein the encoded HARQ feedback comprises the calculated modulo (M+1) of the sum of index values.

* * * * *